United States Patent
Bitincka et al.

(10) Patent No.: US 10,678,696 B2
(45) Date of Patent: *Jun. 9, 2020

(54) PRE-FETCHING FILES FROM BUCKETS IN REMOTE STORAGE FOR A CACHE BASED ON FILE USAGE HISTORY

(71) Applicant: Splunk, Inc., San Francisco, CA (US)

(72) Inventors: Ledion Bitincka, San Francisco, CA (US); Alexandros Batsakis, San Francisco, CA (US); Paul J. Lucas, San Francisco, CA (US); Nicholas Robert Romito, San Francisco, CA (US)

(73) Assignee: Splunk, Inc., San Francisco, CA (US)

(*) Notice: Subject to any disclaimer, the term of this patent is extended or adjusted under 35 U.S.C. 154(b) by 18 days.

This patent is subject to a terminal disclaimer.

(21) Appl. No.: 16/049,357

(22) Filed: Jul. 30, 2018

(65) Prior Publication Data
US 2018/0336215 A1  Nov. 22, 2018

Related U.S. Application Data

(63) Continuation of application No. 15/402,105, filed on Jan. 9, 2017, now Pat. No. 10,067,876.

(51) Int. Cl.
*G06F 12/00* (2006.01)
*G06F 12/0875* (2016.01)
(Continued)

(52) U.S. Cl.
CPC .......... *G06F 12/0875* (2013.01); *G06F 3/061* (2013.01); *G06F 3/0611* (2013.01);
(Continued)

(58) Field of Classification Search
CPC ......... G06F 17/30132; G06F 17/30106; G06F 3/061; G06F 3/0611; G06F 12/0802;
(Continued)

(56) References Cited

U.S. PATENT DOCUMENTS

2008/0104315 A1   5/2008  Hall
2010/0241654 A1*  9/2010  Wu ..................... G06F 12/0862
                                                          707/769

OTHER PUBLICATIONS

Benoit Dageville et al., "The Snowflake Elastic Data Warehouse", Jun. 26, 2016 (12 pages).

* cited by examiner

*Primary Examiner* — Shawn X Gu
(74) *Attorney, Agent, or Firm* — Ferguson Braswell Fraser Kubasta PC

(57) ABSTRACT

Embodiments are disclosed for a prefetching method that may include copying, in response to a search query, a first bucket from a remote storage to a cache. The first bucket may include first data associated with the search query. The method may further include identifying a first file type associated with a first file in the first bucket. The first file may be associated with a usage status. The method may further include accessing, based on the search query, a second bucket from the remote storage. The second bucket may include second data associated with the search query. The method may further include identifying a second file in the second bucket having the first file type, and copying, in response to the usage status indicating that the first file was used in processing the search query, the second file from the remote storage to the cache.

30 Claims, 16 Drawing Sheets

(51) Int. Cl.
  *G06F 16/172* (2019.01)
  *G06F 16/951* (2019.01)
  *G06F 16/957* (2019.01)
  *G06F 3/06* (2006.01)
  *G06F 12/0802* (2016.01)

(52) U.S. Cl.
  CPC ........ *G06F 12/0802* (2013.01); *G06F 16/172* (2019.01); *G06F 16/951* (2019.01); *G06F 16/9574* (2019.01); *G06F 2212/1021* (2013.01); *G06F 2212/45* (2013.01); *G06F 2212/6024* (2013.01); *G06F 2212/6026* (2013.01); *G06F 2212/6028* (2013.01)

(58) Field of Classification Search
  CPC ............. G06F 12/0862; G06F 12/0866; G06F 12/0868; G06F 12/0871; G06F 12/0873; G06F 2212/6024; G06F 2212/6026; G06F 2212/6028
  See application file for complete search history.

PRE-FETCHING FILES FROM BUCKETS IN REMOTE STORAGE FOR A CACHE BASED ON FILE USAGE HISTORY

CROSS-REFERENCE TO RELATED APPLICATION

The present application is a continuation application of and, thereby, claims benefit under 35 U.S.C. § 120 to U.S. application Ser. No. 15/402,105, entitled, "PRE-FETCHING DATA FROM BUCKETS IN REMOTE STORAGE FOR A CACHE," filed on Jan. 9, 2017, issued as U.S. Pat. No. 10,067,876, having the same inventors, and incorporated herein by reference.

BACKGROUND

In order to manage costs and accessibility, data is typically stored in data stores with varying access times (e.g., latency). That is, some data may be stored in a limited capacity, high-speed, expensive cache, while other data may be stored in high capacity, low-speed, inexpensive remote storage. Various strategies have been used to predict what data should be stored locally, and when such data should be transferred from remote storage to the cache. Because the cache has limited capacity, preferably only a minimum amount of data is obtained in advance from remote storage to the cache.

DETAILED DESCRIPTION

Figure 1:
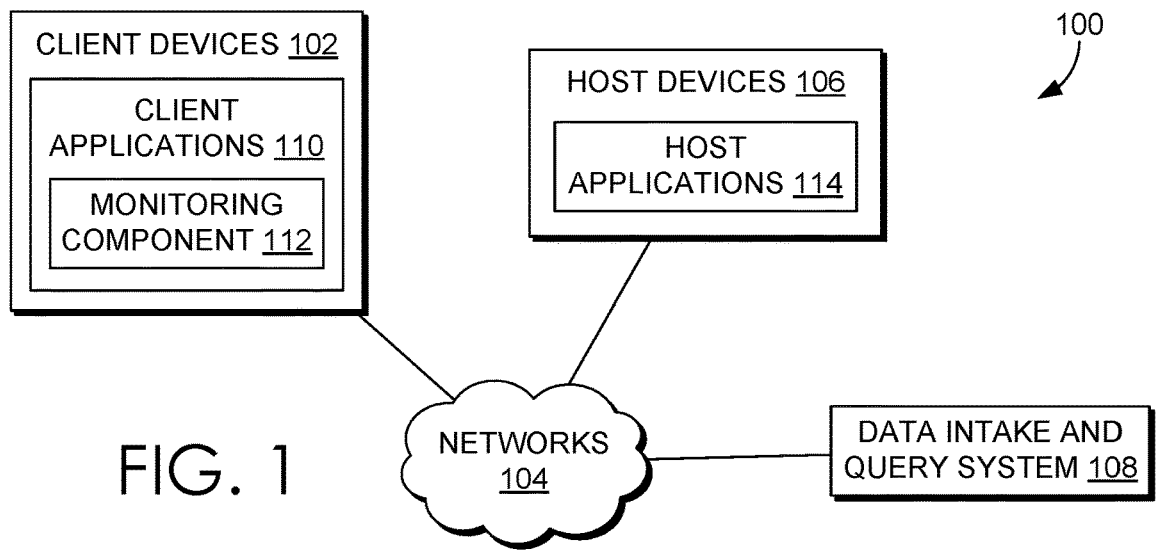
FIG. 1 illustrates a networked computer environment in which an embodiment may be implemented.

Embodiments are described herein according to the following outline:

1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Cloud-Based System Overview
   2.9. Searching Externally Archived Data
      2.9.1. ERP Process Features
3.0. Caching Subsystem
   3.1. Cache Manager
   3.2. Search Bucket predictor
   3.3. Prefetching and Cache Aware Searching Methods
   3.4 Examples Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Executive Summary

In general, embodiments of the invention involve pre-fetching data from a remote storage to a cache. In one or more embodiments, the data may be partitioned into buckets. Each bucket may contain a set of files (e.g., to be used while processing the search query). In one or more embodiments, a file in a candidate bucket may be prefetched based on whether one or more files having the same file type that were prefetched in one or more other buckets. For example, if index files were prefetched in at least one of the two most recently processed buckets, then a decision to prefetch the index file in the candidate bucket may be made.

The number of prefetched files in the cache may be based on the size of a bucket prefetch window. The size of the bucket prefetch window may be dynamically adjusted based on the performance of a search relative to the list of buckets. For example, when most files used to search a bucket are already stored in the cache, then fewer additional files may be prefetched, and the size of the bucket prefetch window may shrink. However, when most files used to search a bucket are stored remotely, incurring longer access times as requested data is copied from the remote storage to the cache, then additional files may be prefetched, and the size of the bucket prefetch window may expand. That is, execution of the search query may continue on prefetched files while waiting for other requested files to be copied from the remote storage to the cache.

The size of the bucket prefetch window may be based on a ratio of the wait time to the search time for a processed bucket. The wait time is the time that a search spends waiting for files to be copied from the remote storage to the cache. For example, it may be the case that only a subset of the files of the bucket must be copied from the remote storage. Ideally, each file of the bucket needed by the search would already be prefetched into the cache, with no waiting required. The search time is the time taken to execute the search query relative to the files of the bucket.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters forms a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system (100) in which an embodiment may be implemented. Those skilled in the art would understand that FIG. 1 represents one example of a networked computer system and other embodiments may use different arrangements.

The networked computer system (100) comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices (102) are coupled to one or more host devices (106) and a data intake and query system (108) via one or more networks (104). Networks (104) broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system (100) includes one or more host devices (106). Host devices (106) may broadly include any number of computers, virtual machine instances, and/or data centers that are configured to host or execute one or more instances of host applications (114). In general, a host device (106) may be involved, directly or indirectly, in processing requests received from client devices (102). Each host device (106) may comprise, for example, one or more of a network device, a web server, an application server, a database server, etc. A collection of host devices (106) may be configured to implement a network-based service. For example, a provider of a network-based service may configure one or more host devices (106) and host applications (114) (e.g., one or more web servers, application servers, database servers, etc.) to collectively implement the network-based application.

In general, client devices (102) communicate with one or more host applications (114) to exchange information. The communication between a client device (102) and a host application (114) may, for example, be based on the Hypertext Transfer Protocol (HTTP) or any other network protocol. Content delivered from the host application (114) to a client device (102) may include, for example, HTML documents, media content, etc. The communication between a client device (102) and host application (114) may include sending various requests and receiving data packets. For example, in general, a client device (102) or application running on a client device may initiate communication with a host application (114) by making a request for a specific resource (e.g., based on an HTTP request), and the application server may respond with the requested content stored in one or more response packets.

In the illustrated embodiment, one or more host applications (114) may generate various types of performance data during operation, including event logs, network data, sensor data, and other types of machine-generated data. For example, a host application (114) comprising a web server may generate one or more web server logs in which details of interactions between the web server and any number of client devices (102) is recorded. As another example, a host device (106) comprising a router may generate one or more router logs that record information related to network traffic managed by the router. As yet another example, a host application (114) comprising a database server may generate one or more logs that record information related to requests sent from other host applications (114) (e.g., web servers or application servers) for data managed by the database server.

2.2. Client Devices

Client devices (102) of FIG. 1 represent any computing device capable of interacting with one or more host devices (106) via a network (104). Examples of client devices (102) may include, without limitation, smart phones, tablet computers, handheld computers, wearable devices, laptop computers, desktop computers, servers, portable media players, gaming devices, and so forth. In general, a client device (102) can provide access to different content, for instance, content provided by one or more host devices (106), etc. Each client device (102) may comprise one or more client applications (110), described in more detail in a separate section hereinafter.

2.3. Client Device Applications

In an embodiment, each client device (102) may host or execute one or more client applications (110) that are capable of interacting with one or more host devices (106) via one or more networks (104). For instance, a client application (110) may be or comprise a web browser that a user may use to navigate to one or more websites or other resources provided by one or more host devices (106). As another example, a client application (110) may comprise a mobile application or "app." For example, an operator of a network-based service hosted by one or more host devices (106) may make available one or more mobile apps that enable users of client devices (102) to access various resources of the network-based service. As yet another example, client applications (110) may include background processes that perform various operations without direct interaction from a user. A client application (110) may include a "plug-in" or "extension" to another application, such as a web browser plug-in or extension.

In an embodiment, a client application (110) may include a monitoring component (112). At a high level, the monitoring component (112) comprises a software component or other logic that facilitates generating performance data related to a client device's operating state, including monitoring network traffic sent and received from the client device and collecting other device and/or application-specific information. Monitoring component (112) may be an integrated component of a client application (110), a plug-in, an extension, or any other type of add-on component. Monitoring component (112) may also be a stand-alone process.

In one embodiment, a monitoring component (112) may be created when a client application (110) is developed, for example, by an application developer using a software development kit (SDK). The SDK may include custom monitoring code that can be incorporated into the code implementing a client application (110). When the code is converted to an executable application, the custom code implementing the monitoring functionality can become part of the application itself.

In some cases, an SDK or other code for implementing the monitoring functionality may be offered by a provider of a data intake and query system, such as a system (108). In such cases, the provider of the system (108) can implement the custom code so that performance data generated by the monitoring functionality is sent to the system (108) to facilitate analysis of the performance data by a developer of the client application or other users.

In an embodiment, the custom monitoring code may be incorporated into the code of a client application (110) in a number of different ways, such as the insertion of one or more lines in the client application code that call or otherwise invoke the monitoring component (112). As such, a developer of a client application (110) can add one or more lines of code into the client application (110) to trigger the monitoring component (112) at desired points during execution of the application. Code that triggers the monitoring component may be referred to as a monitor trigger. For instance, a monitor trigger may be included at or near the beginning of the executable code of the client application (110) such that the monitoring component (112) is initiated or triggered as the application is launched, or included at other points in the code that correspond to various actions of the client application, such as sending a network request or displaying a particular interface.

In an embodiment, the monitoring component (112) may monitor one or more aspects of network traffic sent and/or received by a client application (110). For example, the monitoring component (112) may be configured to monitor data packets transmitted to and/or from one or more host applications (114). Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application (110) or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system (108) for analysis.

Upon developing a client application (110) that incorporates a monitoring component (112), the client application (110) can be distributed to client devices (102). Applications generally can be distributed to client devices (102) in any manner, or they can be pre-loaded. In some cases, the application may be distributed to a client device (102) via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component (112) may also monitor and collect performance data related to one or more aspects of the operational state of a client application (110) and/or client device (102). For example, a monitoring component (112) may be configured to collect device performance information by monitoring one or more client device operations, or by making calls to an operating system and/or one or more other applications executing on a client device (102) for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component (112) may also monitor and collect other device profile information including, for example, a type of client device, a manufacturer and model of the device, versions of various software applications installed on the device, and so forth.

In general, a monitoring component (112) may be configured to generate performance data in response to a monitor trigger in the code of a client application (110) or other triggering application event, as described above, and to store the performance data in one or more data records. Each data record, for example, may include a collection of field-value pairs, each field-value pair storing a particular item of performance data in association with a field for the item. For example, a data record generated by a monitoring component (112) may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
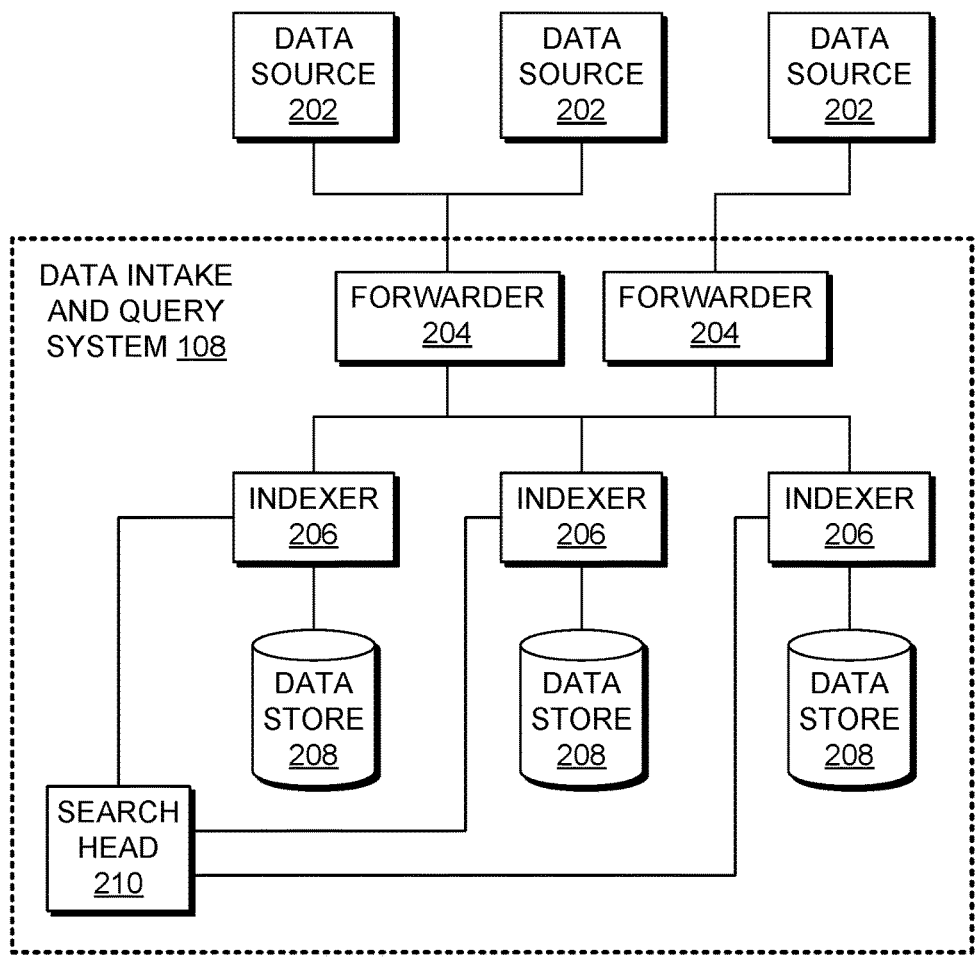
FIG. 2 illustrates a block diagram of an example data intake and query system in which an embodiment may be implemented.

FIG. 2 depicts a block diagram of an exemplary data intake and query system (108), similar to the SPLUNK® ENTERPRISE system. System (108) includes one or more forwarders (204) that receive data from a variety of input data sources (202), and one or more indexers (206) that process and store the data in one or more data stores (208). These forwarders and indexers can comprise separate computer systems, or may alternatively comprise separate processes executing on one or more computer systems.

Each data source (202) broadly represents a distinct source of data that can be consumed by a system (108). Examples of a data source (202) include, without limitation, data files, directories of files, data sent over a network, event logs, registries, etc.

During operation, the forwarders (204) identify which indexers (206) receive data collected from a data source (202) and forward the data to the appropriate indexers. Forwarders (204) can also perform operations on the data before forwarding, including removing extraneous data, detecting timestamps in the data, parsing data, indexing data, routing data based on criteria relating to the data being routed, and/or performing other data transformations.

In an embodiment, a forwarder (204) may comprise a service accessible to client devices (102) and host devices (106) via a network (104). For example, one type of forwarder (204) may be capable of consuming vast amounts of real-time data from a potentially large number of client devices (102) and/or host devices (106). The forwarder (204) may, for example, comprise a computing device which implements multiple data pipelines or "queues" to handle forwarding of network data to indexers (206). A forwarder (204) may also perform many of the functions that are performed by an indexer. For example, a forwarder (204) may perform keyword extractions on raw data or parse raw data to create events. A forwarder (204) may generate time stamps for events. Additionally or alternatively, a forwarder (204) may perform routing of events to indexers. Data store (208) may contain events derived from machine data from a variety of sources all pertaining to the same component in an IT environment, and this data may be produced by the machine in question or by other components in the IT environment.

In one or more embodiments of the invention, data store (208) is any type of storage unit and/or device (e.g., a file system, database, collection of tables, or any other storage mechanism) for storing data. Further, data store (208) may include multiple different storage units and/or devices. The multiple different storage units and/or devices may or may not be of the same type or located at the same physical site.

Data store (208) may include a cache and remote storage. Cache is any type of storage device from which data is accessed and processed by the search head (210) and/or indexer (206). Cache may be or may include RAM disk, solid-state disks, and/or may be or include any other storage. The remote storage is any storage that is remote in the data path relative to the cache with respect to the search head (210) and/or indexer (206). In other words, whereas the search head may have direct access to the cache, the search head (210) and/or indexer (206) has indirect access to the remote storage. The remote storage may or may not be physically remote from all or part of the remainder of the data intake and query system (108). For example, the remote storage may be a part of a physical device having the remainder of one or more parts of the data intake and query system (108), located in a different device and connected via a network (e.g., intranet, virtual private network, Internet), or at another physical location. Cache may have fast access times (e.g., latency) relative to remote storage. Cache may have less storage capacity than remote storage. The data (e.g., events) stored in cache may be a subset of the data stored in remote storage. The performance of an indexer (206) may be enhanced when the data requested by the indexer (206) resides in cache, rather than remote storage.

2.5. Data Ingestion

Figure 3:
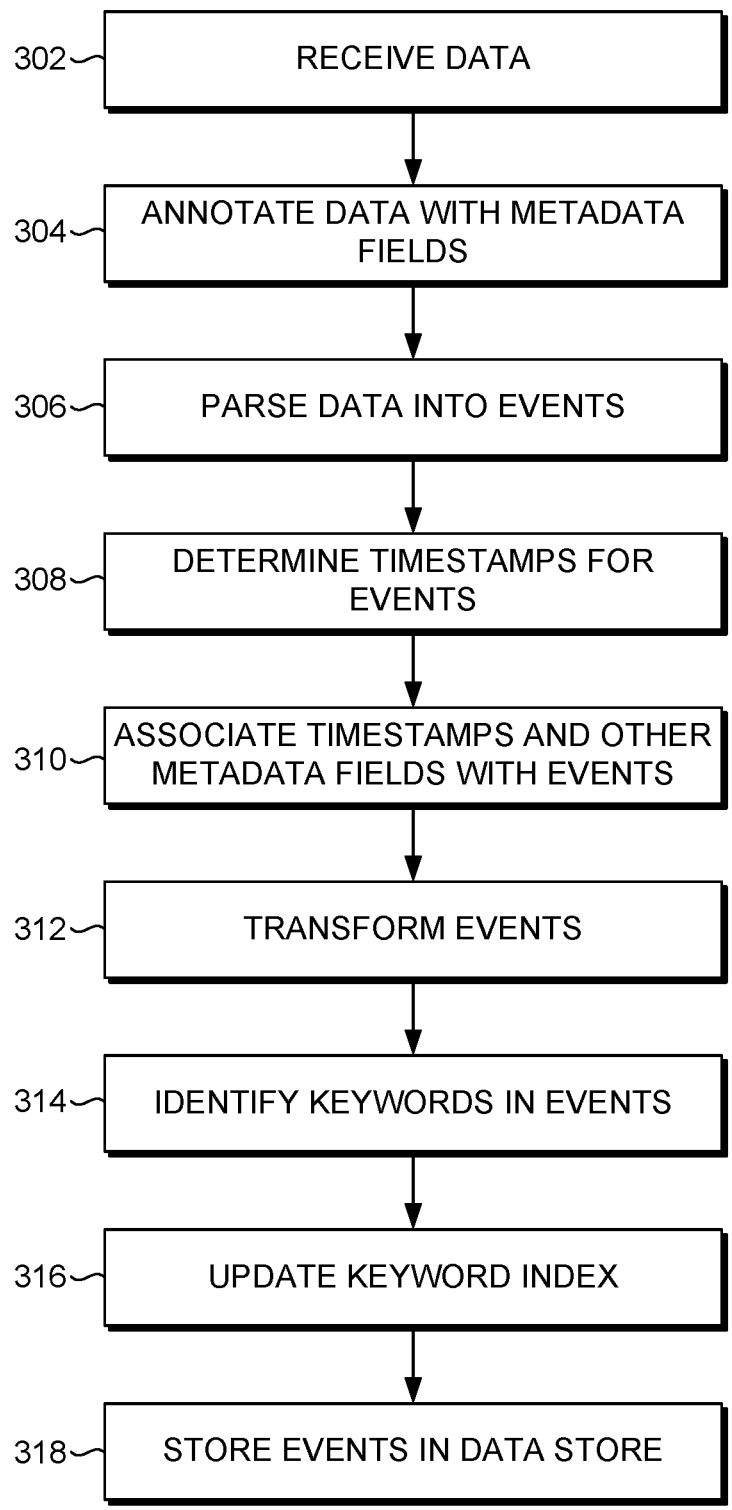
FIG. 3 is a flow diagram that illustrates how indexers process, index, and store data received from forwarders in accordance with the disclosed embodiments.

FIG. 3 depicts a flow chart illustrating an example data flow performed by Data Intake and Query system (108), in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block (302), a forwarder receives data from an input source, such as a data source (202) shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block (304), a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block (306), an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block (308), the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block (310), the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block (304), the default metadata fields associated with each event may include a host, source, and source type field including or in addition to a field storing the timestamp.

At block (312), an indexer may optionally apply one or more transformations to data included in the events created at block (306). For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks (314) and (316), an indexer can optionally generate a keyword index to facilitate fast keyword searching for event data. To build a keyword index, at block (314), the indexer identifies a set of keywords in each event. At block (316), the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block (318), the indexer stores the events with an associated timestamp in a data store (208). Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk. In the example, the flash memory and the hard disk may be remote storage. In another example, the flash memory is an example of cache and the hard disk may be remote storage. Other configurations may be used without departing from the scope of the invention.

Each indexer (206) may be responsible for storing and searching a subset of the events contained in a corresponding data store (208). By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
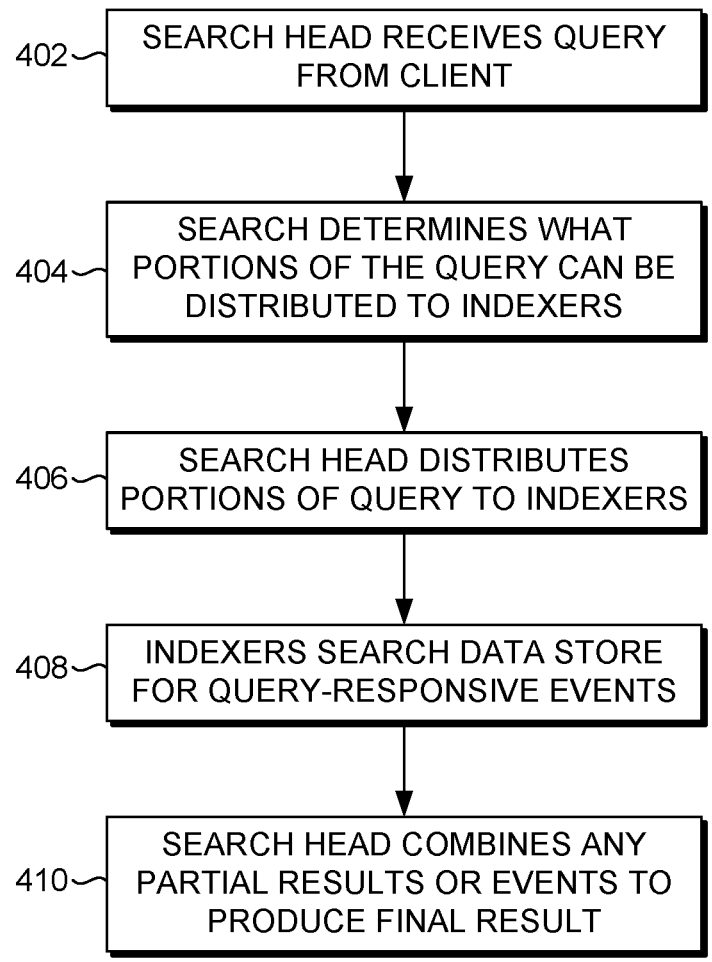
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block (402), a search head receives a search query from a client. At block (404), the search head analyzes the search query to determine what portion(s) of the query can be delegated to indexers and what portions of the query can be executed locally by the search head. At block (406), the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in the Figure) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block (408), the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block (408) may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block (410), the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system (108) can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head (210) allows users to search and visualize event data extracted from raw machine data received from homogenous data sources. It also allows users to search and visualize event data extracted from raw machine data received from heterogeneous data sources. The search head (210) includes various mechanisms, which may additionally reside in an indexer (206), for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language (SQL), can be used to create a query.

In response to receiving the search query, search head (210) uses extraction rules to extract values for the fields associated with a field or fields in the event data being searched. The search head (210) obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head (210) can apply the extraction rules to event data that it receives from indexers (206). Indexers (206) may apply the extraction rules to events in an associated data store (208). Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
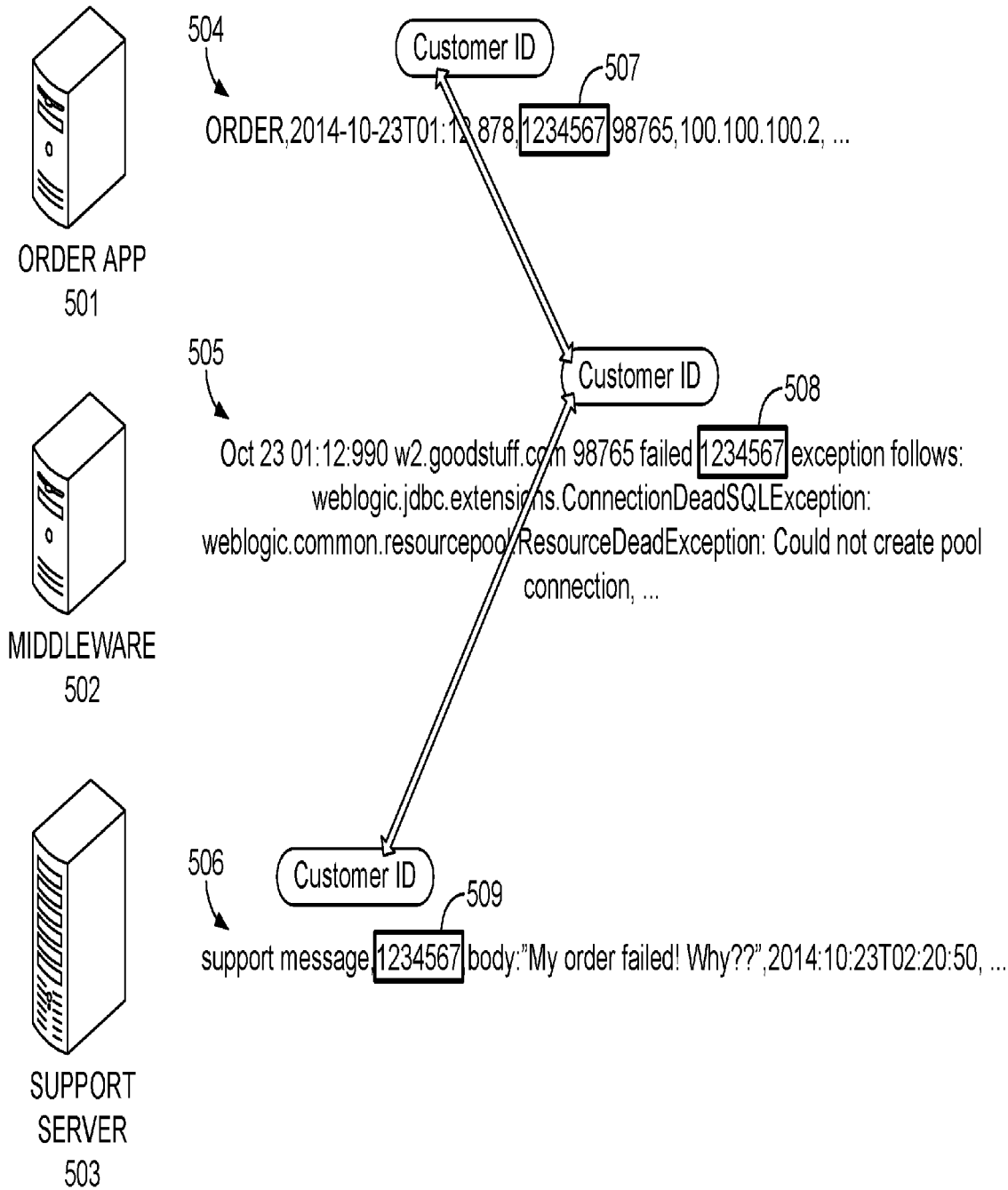
FIG. 5 illustrates an example scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program (501) running on the user's system. In this example, the order was not delivered to the vendor's server due to a resource exception at the destination server that is detected by the middleware code (502). The user then sends a message to the customer support (503) to complain about the order failing to complete. The three systems (501), (502), and (503) are disparate systems that do not have a common logging format. The order application (501) sends log data (504) to the SPLUNK® ENTERPRISE system in one format, the middleware code (502) sends error log data (505) in a second format, and the support server (503) sends log data (506) in a third format.

Using the log data received at one or more indexers (206) from the three systems the vendor can uniquely obtain an insight into user activity, user experience, and system behavior. The search head (210) allows the vendor's administrator to search the log data from the three systems that one or more indexers (206) are responsible for searching, thereby obtaining correlated information, such as the order number and corresponding customer ID number of the person placing the order. The system also allows the administrator to see a visualization of related events via a user interface. The administrator can query the search head (210) for customer ID field value matches across the log data from the three systems that are stored at the one or more indexers (206). The customer ID field value exists in the data gathered from the three systems, but the customer ID field value may be located in different areas of the data given differences in the architecture of the systems—there is a semantic relationship between the customer ID field values generated by the three systems. The search head (210) requests event data from the one or more indexers (206) to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values (507), (508), and (509), thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Cloud-Based System Overview

The example data intake and query system (108) described in reference to FIG. 2 comprises several system components, including one or more forwarders, indexers, and search heads. In some environments, a user of a data intake and query system (108) may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system (108) is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system (108) operate.

In one embodiment, to provide an alternative to an entirely on-premises environment for system (108), one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 6:
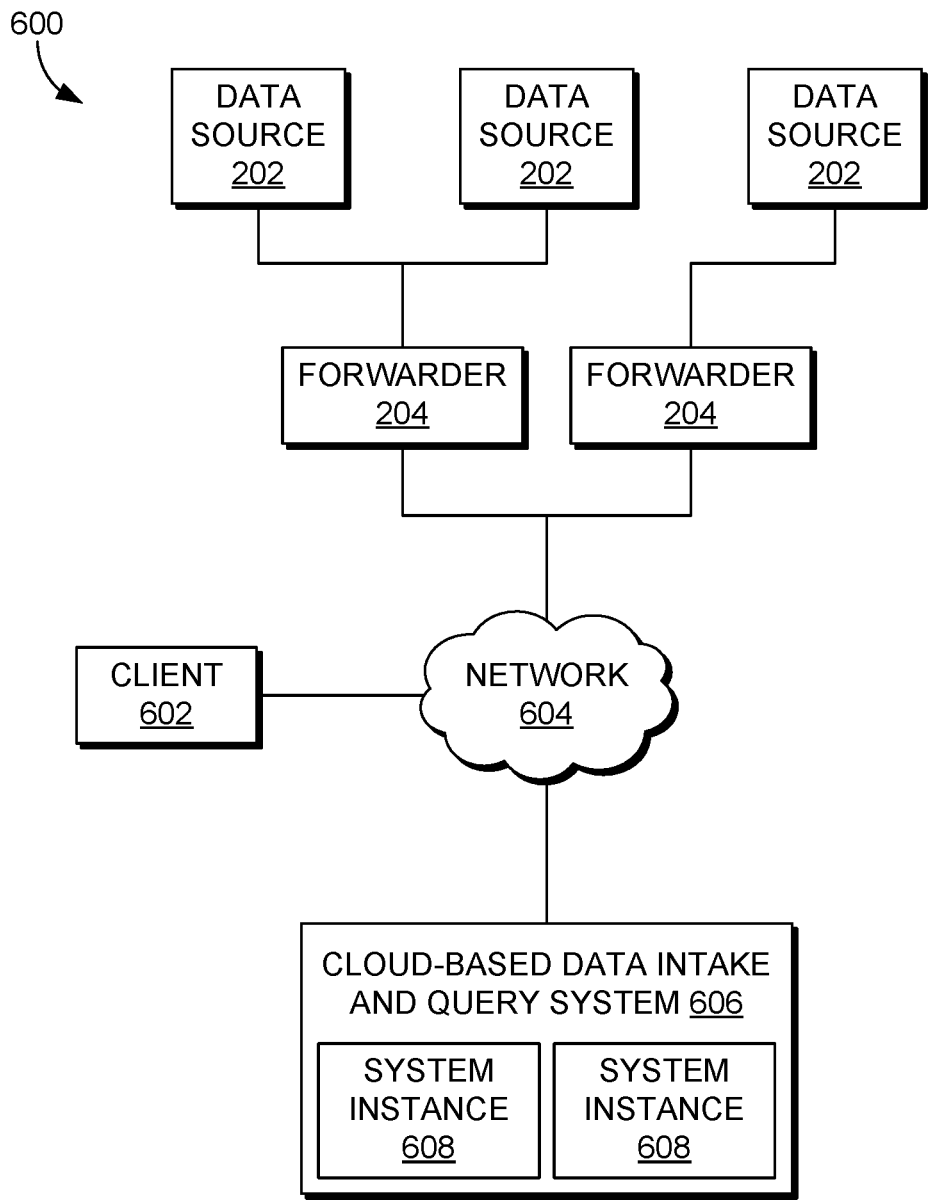
FIG. 6 illustrates a block diagram of an example cloud-based data intake and query system in which an embodiment may be implemented.

FIG. 6 illustrates a block diagram of an example cloud-based data intake and query system. Similar to the system of FIG. 2, the networked computer system (600) includes input data sources (202) and forwarders (204). These input data sources and forwarders may be in a subscriber's private computing environment. Alternatively, they might be directly managed by the service provider as part of the cloud service. In the example system (600), one or more forwarders (204) and client devices (602) are coupled to a cloud-based data intake and query system (606) via one or more networks (604). Network (604) broadly represents one or more LANs, WANs, cellular networks, intranet, etc., using any of wired, wireless, terrestrial microwave, satellite links, etc., and may include the public Internet, and is used by client devices (602) and forwarders (204) to access the system (606). Similar to the system of (108), each of the forwarders (204) may be configured to receive data from an input source and to forward the data to other components of the system (606) for further processing.

In an embodiment, a cloud-based data intake and query system (606) may comprise a plurality of system instances (608). In general, each system instance (608) may include one or more computing resources managed by a provider of the cloud-based system (606) made available to a particular subscriber. The computing resources comprising a system instance (608) may, for example, include one or more servers or other devices configured to implement one or more forwarders, indexers, search heads, and other components of a data intake and query system, similar to system (108). As indicated above, a subscriber may use a web browser or other application of a client device (602) to access a web portal or other interface that enables the subscriber to configure an instance (608).

Providing a data intake and query system as described in reference to system (108) as a cloud-based service presents a number of challenges. Each of the components of a system (108) (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance (608)) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.9. Searching Externally Archived Data

Figure 7:
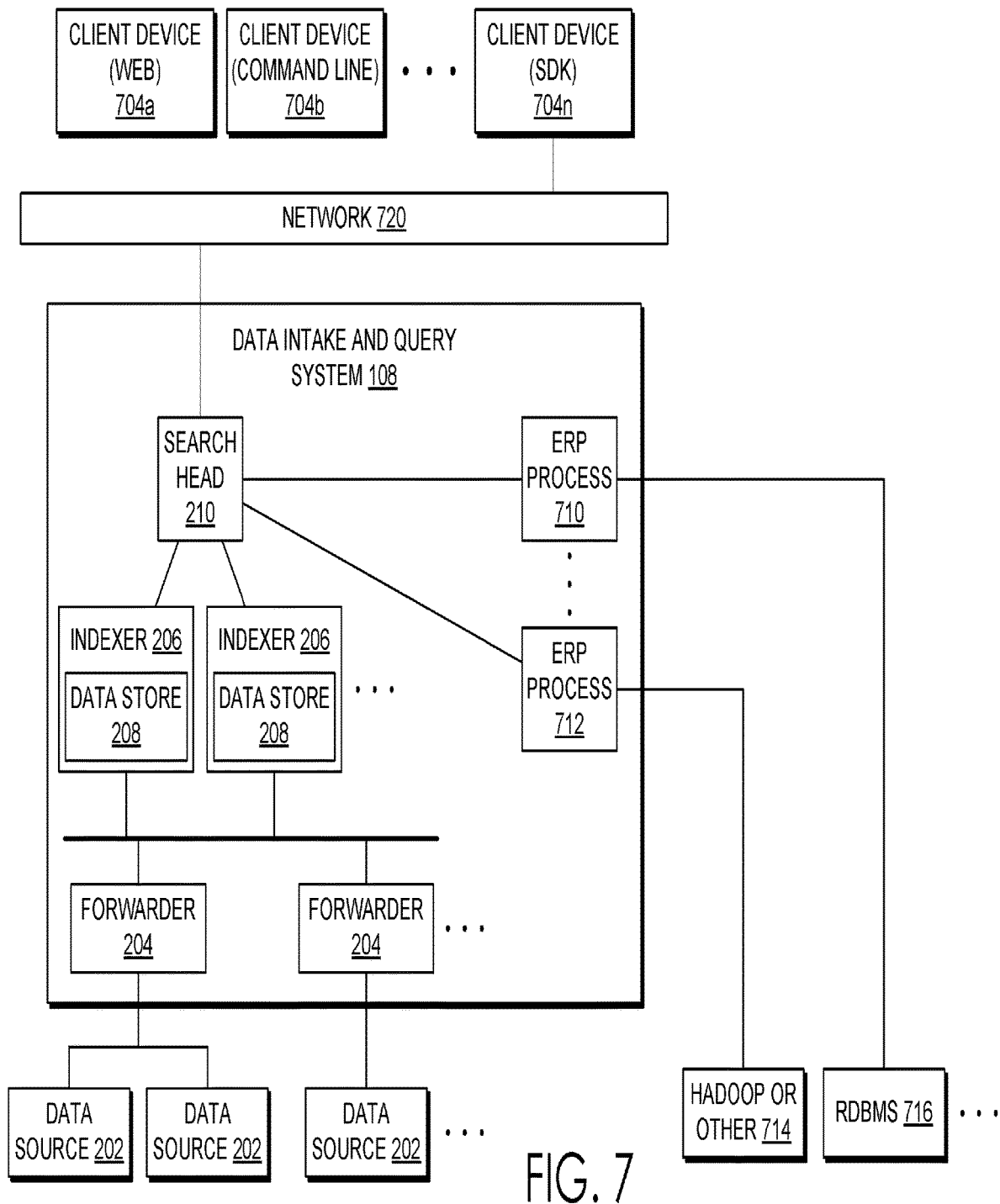
FIG. 7 illustrates a block diagram of an example data intake and query system that performs searches across external data systems in accordance with the disclosed embodiments.

FIG. 7 shows a block diagram of an example of a data intake and query system (108) that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head (210) of the data intake and query system receives search requests from one or more client devices (704) over network connections (720). As discussed above, the data intake and query system (108) may reside in an enterprise location, in the cloud, etc. FIG. 7 illustrates that multiple client devices (704a), (704b), . . . , (704n) may communicate with the data intake and query system (108). The client devices (704) may communicate with the data intake and query system using a variety of connections. For example, one client device in FIG. 7 is illustrated as communicating over an Internet (Web) protocol, another client device is illustrated as communicating via a command line interface, and another client device is illustrated as communicating via a system developer kit (SDK).

The search head (210) analyzes the received search request to identify request parameters. If a search request received from one of the client devices (704) references an index maintained by the data intake and query system, then the search head (210) connects to one or more indexers (206) of the data intake and query system for the index referenced in the request parameters. That is, if the request parameters of the search request reference an index, then the search head accesses the data in the index via the indexer. The data intake and query system (108) may include one or more indexers (206), depending on system access resources and requirements. As described further below, the indexers (206) retrieve data from their respective local data stores (208) as specified in the search request. The indexers and their respective data stores can comprise one or more storage devices and typically reside on the same system, though they may be connected via a local network connection.

If the request parameters of the received search request reference an external data collection, which is not accessible to the indexers (206) or under the management of the data intake and query system, then the search head (210) can access the external data collection through an External Result Provider (ERP) process (710). An external data collection may be referred to as a "virtual index" (plural, "virtual indices"). An ERP process provides an interface through which the search head (210) may access virtual indices.

Thus, a search reference to an index of the system relates to a locally stored and managed data collection. In contrast, a search reference to a virtual index relates to an externally stored and managed data collection, which the search head may access through one or more ERP processes (710), (712). FIG. 7 shows two ERP processes (710), (712) that connect to respective remote (external) virtual indices, which are indicated as a Hadoop or another system (714) (e.g., Amazon S3, Amazon EMR, other Hadoop Compatible File Systems (HCFS), etc.) and a relational database management system (RDBMS) (718). Other virtual indices may include other file organizations and protocols, such as Structured Query Language (SQL) and the like. The ellipses between the ERP processes (710), (712) indicate optional additional ERP processes of the data intake and query system (108). An ERP process may be a computer process that is initiated or spawned by the search head (210) and is executed by the search data intake and query system (108). Alternatively or additionally, an ERP process may be a process spawned by the search head (210) on the same or different host system as the search head (210) resides.

The search head (210) may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head (210) determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes (710), (712) receive a search request from the search head (210). The search head may optimize the received search request for execution at the respective external virtual index. Alternatively, the ERP process may receive a search request as a result of analysis performed by the search head or by a different system process. The ERP processes (710), (712) can communicate with the search head (210) via conventional input/output routines (e.g., standard in/standard out, etc.). In this way, the ERP process receives the search request from a client device such that the search request may be efficiently executed at the corresponding external virtual index.

The ERP processes (710), (712) may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes (710), (712) generate appropriate search requests in the protocol and syntax of the respective virtual indices (714), (718), each of which corresponds to the search request received by the search head (210). Upon receiving search results from their corresponding virtual indices, the respective ERP process passes the result to the search head (210), which may return or display the results or a processed set of results based on the returned results to the respective client device.

Client devices (704) may communicate with the data intake and query system (108) through a network interface (720), e.g., one or more LANs, WANs, cellular networks, and/or intranet using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.9.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the] streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

3.0. Caching Subsystem
3.1. Cache Manager

Figure 8A:
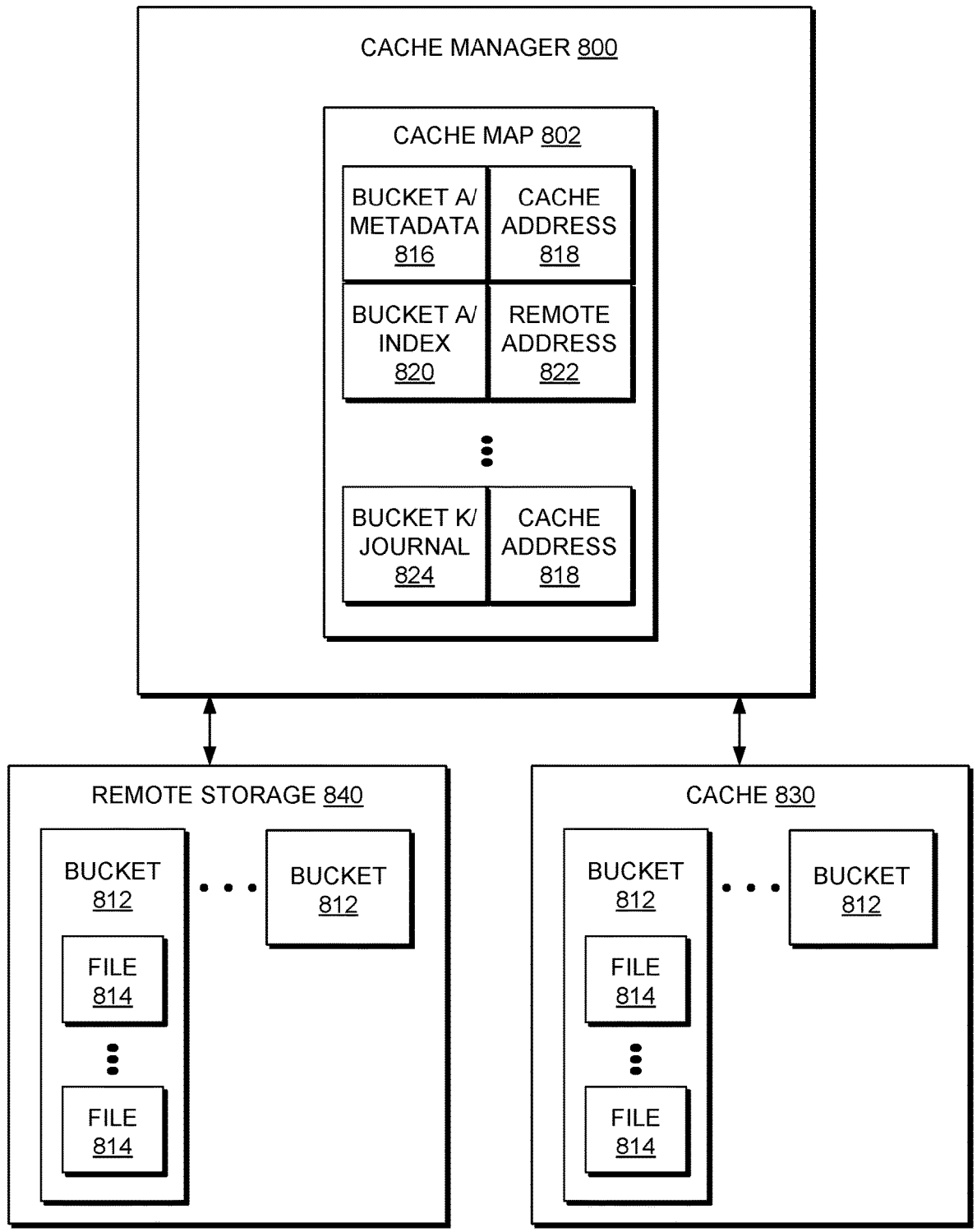
FIG. 8A illustrates a block diagram of an example cache manager in which an embodiment may be implemented.

FIG. 8A shows a cache manager (800), cache (830) and remote storage (840) in accordance with one or more embodiments. In one or more embodiments, the cache (830) and remote storage (840) may be included in a data store (208). In one or more embodiments, the cache manager (800) may be implemented in hardware (e.g., circuitry), software, or any combination thereof. The cache manager (800) may include functionality to manage the contents of the cache (830) and remote storage (840). For example, the cache manager (800) may copy data from remote storage (840) to the cache (830) when an indexer (206) requests access to the data. In one or more embodiments, the cache manager (800) may prefetch data (e.g., based on a prediction by the search bucket predictor (850) of FIG. 8B), in order to avoid causing the indexer (206) to slow down or halt processing activities due to waiting for data to be copied to cache (830).

As shown in FIG. 8A, the cache manager (800) includes a cache map (802). The remote storage (840) may include buckets (812). In one or more embodiments, a bucket (812) may be associated with a specific time frame. In other words, each bucket may be for a defined time range. For example, each bucket (812) may store events associated with a specific time range based on the timestamps associated with each event. By partitioning data for events into buckets according to the timestamps of the event, one or more embodiments may not only improve time-based searching, but also allows for events with recent timestamps, which may have a higher likelihood of being accessed, to be stored in a faster memory (e.g., cache (830)) to facilitate faster retrieval. For example, buckets (812) containing the most recent events may be stored in flash memory rather than on a hard disk. By storing events in buckets (812) for specific time ranges, an indexer (206) may further optimize data retrieval process by searching buckets (812) corresponding to time ranges that are relevant to a query. In one or more embodiments, a bucket (812) may be associated with any criterion for describing a collection of data. In one or more embodiments, the various buckets (812) may be of uniform size.

Each bucket (812) may include files (814). A file (814) may represent a logical subdivision of the data contained in the bucket (812). In one or more embodiments, a file (814) may be a metadata file, an index file, a journal file, etc. In one or more embodiments, each file (814) has an associated file type. Examples of file types may include: Bloom filter, metadata, index, and journal. In one or more embodiments, the relative sizes of these file types are, from smallest to largest: metadata, Bloom filter, journal, and index.

In one or more embodiments, the remote storage (840) contains the full contents of each bucket (812). That is, the remote storage (840) may contain each file (814) of each bucket (812). In contrast, in one or more embodiments, the cache (830) may contain partial contents of a subset of the buckets (812) stored in the remote storage (840). That is, the cache (830) may contain a subset of the files (814) of a bucket (812). As an example, the cache (830) may store the metadata and index for a particular bucket (812), but not the corresponding journal.

A file (814) may, for example, provide information related to the data stored in the bucket (812) as a whole and may apply to each event that is subsequently derived from the data in the bucket (812). For example, metadata may include separate fields specifying each of a host, a source, and a source type related to the bucket (812). A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder (204) forwards the annotated bucket (812) to another system component (typically an indexer (206)) for further processing.

In one or more embodiments, a file (814) (e.g., an index file) may associate keywords with location references to events. The events may be stored in a file (814), which may contain raw data (e.g., data that has been processed into events). In one or more embodiments, a file (814) may contain information used to generate associated files (814) (e.g., a journal file may be used to generate a missing index file).

In one or more embodiments, a file (814) (e.g., a Bloom filter file) is a data structure used to test whether an element is a member of a set. For example, since a Bloom filter does not produce a false negative result, and therefore may be used to quickly determine whether a bucket (812) contains a specific keyword of a search query, and thereby eliminate the bucket (812) from further processing of the search query.

A file type may be defined by a file extension of the file, a filename of the file, a data format of data in the file, another property of the file, or any combination thereof.

In one or more embodiments, the files (814) of a bucket (812) may be processed in a sequence (e.g., by an indexer (206)) to execute a search query. An example of such a processing sequence may be:

1) evaluate a search query using metadata (e.g., using the metadata to halt further processing of the bucket (812) if the search query specifies a value of a metadata field that is not satisfied by the metadata of the bucket (812));

2) evaluate the search query using a Bloom filter;

3) use the search query to query an index;

4) use the result of querying the index to access data in a journal.

Continuing with FIG. 8A, in one or more embodiments, the cache map (802) indicates an address of a file (814) of a bucket (812). The address of the file (814) may be in the cache (830). Alternatively, the address of the file (814) may be in remote storage (840). For example, in FIG. 8A, the file identifier (816) in the cache map (802) indicates that the metadata of bucket A (812) has a cache address (818). Similarly, the file identifier (824) in the cache map (802) indicates that a journal of bucket K (812) also has a cache address (818). In contrast, the file identifier (820) in the cache map (802) indicates that an index of bucket A (812) has a remote address (822). In one or more embodiments, the size of a file (814) may be included in the entry in the cache map (802) corresponding to the file (814).

In one or more embodiments, the cache manager (800) includes functionality to manage the cache map (802). For example, the cache manager (800) may include functionality to add, remove, and/or modify an entry in the cache map (802) to reflect an updated address of a file (814) (e.g., as files (814) are moved between the cache (830) and remote storage (840)).

In one or more embodiments, the cache manager (800) includes functionality to respond to a request (e.g., from an indexer (206) or a search head (210)) to access a file (814) by providing a cache address (818) of the file (814). In one or more embodiments, the cache manager (800) includes functionality to respond to the request to access the file (814) by copying the file (814) from remote storage (840) to the cache (830). In one or more embodiments, the cache manager (800) includes functionality to respond to a request (e.g., from an indexer (206) or a search head (210)) to close (i.e., release access to) the file (814). In one or more embodiments, the cache manager (800) includes functionality to respond to a request (e.g., from an indexer (206) or a search head (210)) to close (i.e., release access to) a bucket (812). In one or more embodiments, the cache manager (800) includes functionality to respond to a request (e.g., from an indexer (206) or a search head (210)) to store the search time for a bucket (812).

3.2. Search Bucket Predictor

Figure 8B:
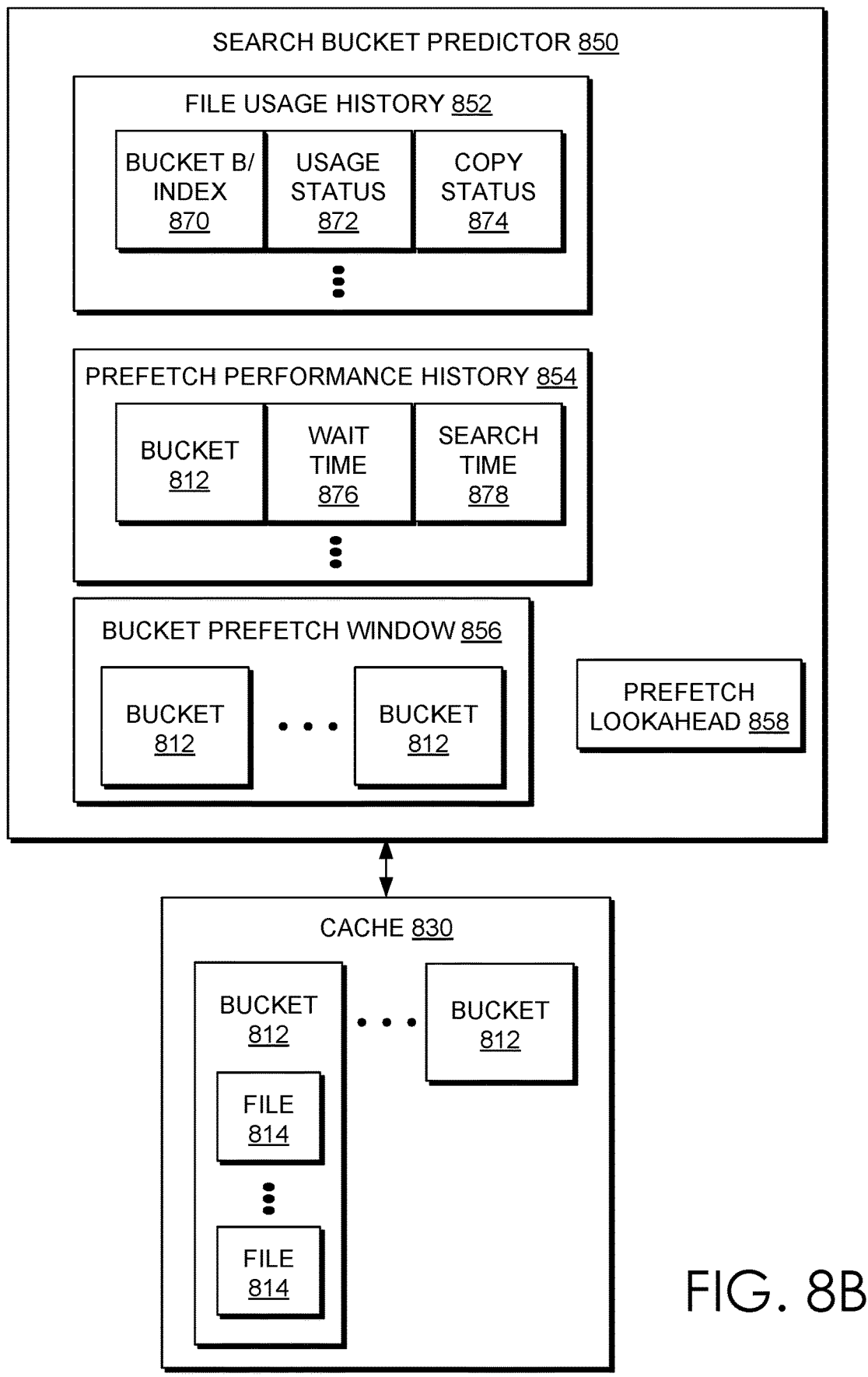
FIG. 8B illustrates a block diagram of an example search bucket predictor in which an embodiment may be implemented.

FIG. 8B shows a search bucket predictor (850) and cache (830) in accordance with one or more embodiments. In one or more embodiments, the search bucket predictor (850) may be implemented in hardware (e.g., circuitry), software, or any combination thereof. In one or more embodiments, the search bucket predictor (850) may execute within a search process created by an indexer (206). As shown in FIG. 8B, the search bucket predictor (850) implements a file usage history (852), a prefetch performance history (854), a bucket prefetch window (856), and a prefetch lookahead (858). In one or more embodiments, a file usage history (804) may include a usage status (872) and a copy status (874) associated with a file (814). In FIG. 8B, the file identifier (870) in the file usage history (804) indicates a usage status (872) and a copy status (874) associated with an index file (814) of bucket B (812). In one or more embodiments, the usage status (872) associated with a file (814) may indicate whether or not the file (814) was used during the processing of a search query relative to the bucket (812) containing the file (814). In one or more embodiments, the usage status (872) may have a binary value (e.g., "used" or "not used"). In one or more embodiments, the usage status (872) may have a numerical value, indicating a level of usage of the file, or a number of accesses to the file. In one or more embodiments, the file usage history (804) may be examined to determine a usage history corresponding to a specific file type (e.g., whether index files been previously used for a given search query being executed).

In one or more embodiments, the copy status (874) associated with a file (814) may indicate whether or not the file (814) was copied to the cache (830). In one or more embodiments, the copy status (874) may have a binary value (e.g., "copied" or "not copied"). In one or more embodiments, the copy status (830) may have a ternary value (e.g., "copied on prefetch", "copied on cache fault", or "not copied"). In one or more embodiments, the copy status (874) may be compared to the usage status (872) to evaluate the accuracy of a prefetching capability. For example, if the prefetching capability was 100% accurate, then a file (814) would be used each time the file (814) was copied.

In one or more embodiments, the file usage history (804) may be stored in the cache (830). In one or more embodiments, the file usage history (804) may include an identifier of a search query (not shown). For example, associating an entry of the file usage history (804) corresponding to a specific file (814) with a search query may facilitate analysis of trends in the usage and copy history of various files (814), relative to different search queries.

In one or more embodiments, a prefetch performance history (854) may include a wait time (876) and a search time (878) associated with a bucket (812). In one or more embodiments, the wait time (876) is the time that a search spends waiting for one or more files (814) of a bucket (812) to be copied from the remote storage (840) to the cache (830). The wait time (876) for a bucket (812) may include the time due to a cache fault that occurs when a file (814) needed for a search is not already resident in the cache (830), and must be copied from remote storage (840). The wait time (876) may also include the time due to waiting for a prefetched file (814) to be copied into the cache (830). For example, the prefetched file (814) may only be partially copied to the cache (830) when the file (814) is requested by the search.

In one or more embodiments, the search time (878) is the time taken to search the files (814) of the bucket (812) to evaluate a search query relative to the bucket (812). For example, if the metadata, the index, and a journal have been used to evaluate a search query relative to a bucket (812), the search time (878) for the bucket (812) includes the time taken to search the metadata, the index, and the journal.

In one or more embodiments, the prefetch performance history (854) may include an identifier of a search query (not shown). For example, associating an entry of the prefetch performance history (854) corresponding to a specific bucket (812) with a search query may facilitate analysis of trends in the prefetch performance of various buckets (812), relative to different search queries.

In one or more embodiments, the bucket prefetch window (856) indicates which buckets (812) are candidates for prefetching. In one or more embodiments, prefetching a bucket (812) includes copying one or more files (814) of the bucket (812) into the cache (830). In one or more embodiments, a file (814) of a bucket (812) is prefetched when the file (814) is copied from remote storage (840) to the cache (830) prior to being explicitly requested (e.g., requested by a search process executing on an indexer (206) processing a search request). In one or more embodiments, a bucket (812) may be added to the bucket prefetch window (856) when the bucket (812) is identified as a candidate for prefetching.

The bucket prefetch window (856) may include references to buckets (812) whose files (814) are predicted to be used in the near term, during the execution of a search query (e.g., performed by a search process executing on an indexer (206)). Once the processing of a bucket (812) has been completed, then the bucket (812) may be no longer needed (e.g., closed) and may be removed from the bucket prefetch window (856)). In one or more embodiments, the bucket prefetch window (856) may be adjusted as buckets (812) are searched (e.g., by an indexer (206)). For example, when a search completes its processing of a current bucket (812) and moves to the next bucket (812), the current bucket (812) may be removed (e.g., "aged out") from the bucket prefetch window (856).

The bucket prefetch window (856) may be thought of a window that slides across a list of buckets (812) as the buckets (812) are searched (e.g., by a search process created by an indexer (206)). For example, if the bucket prefetch window (856) contains Bucket A Bucket B, and Bucket C, then once processing of Bucket A is completed, Bucket A may be removed from the bucket prefetch window (856) and the next bucket (812) in the list of buckets (812) (e.g., Bucket D) may become a candidate for prefetching and may be added to the bucket prefetch window (856).

In one or more embodiments, the prefetch lookahead (858) represents a target number of buckets (812) in the bucket prefetch window (856). For example, if the prefetch lookahead (858) has a value of four, then one or more files (814) of four different buckets (812) may be prefetched. A larger bucket prefetch window (856), and therefore a larger number of prefetched files (814), may make it more likely that an indexer (206) may remain busy while waiting for other files (814) to be copied to the cache (830). In one or more embodiments, the prefetch lookahead (858) must be below a predetermined maximum value (e.g., based on the size of the cache (830)), in order to avoid degrading the performance of the cache (830).

In one or more embodiments, the search bucket predictor (850) includes functionality to manage the file usage history (804). For example, the search bucket predictor (850) may include functionality to add and/or modify an entry in the file usage history (804) based on the usage of a file (814) (e.g., as files (814) are used to evaluate a search query). In addition, the search bucket predictor (850) may include functionality to add and/or modify an entry in the file usage history (804) based on the copy status (874) of a file (814) (e.g., as files (814) are copied to the cache (830) from remote storage (840)). In one or more embodiments, the search bucket predictor (850) includes functionality to predict the usage of a file (814) based on the file usage history (804) of one or more matching files (814) (e.g., files (814) having the same file type or the same file name).

In one or more embodiments, the search bucket predictor (850) includes functionality to manage the prefetch performance history (854). For example, the search bucket predictor (850) may include functionality to add and/or modify an entry in the prefetch performance history (854) based on the amount of time spent waiting for one or more files (814) of a bucket (812) to be copied to the cache (830). In addition, the search bucket predictor (850) may include functionality to add and/or modify an entry in the prefetch performance history (854) based on the amount of time taken to evaluate a search query using one or more files (814) of a bucket (812). Alternatively, in one or more embodiments, a search process created by an indexer (206) may include functionality to manage the prefetch performance history (854).

In one or more embodiments, the search bucket predictor (850) includes functionality to manage the bucket prefetch window (856). For example, the search bucket predictor (850) may include functionality to add a bucket (812) to the bucket prefetch window (856) (e.g., when the first file (814) of the bucket (812) is prefetched) and remove a bucket (812) from the bucket prefetch window (856) (e.g., when the bucket (812) is closed for further processing). In one or more embodiments, the search bucket predictor (850) includes functionality to adjust the prefetch lookahead (858). In one or more embodiments, the prefetch lookahead (858) may be adjusted based on one or more entries of the prefetch performance history (854).

While FIG. 1, FIG. 2, FIG. 6, FIG. 7, FIG. 8A, and FIG. 8B show configurations of components, other configurations may be used without departing from the scope of the invention. For example, various components may be combined to create a single component. As another example, the functionality performed by a single component may be performed by two or more components.

3.3. Prefetching and Cache Aware Searching Methods

Figure 9:
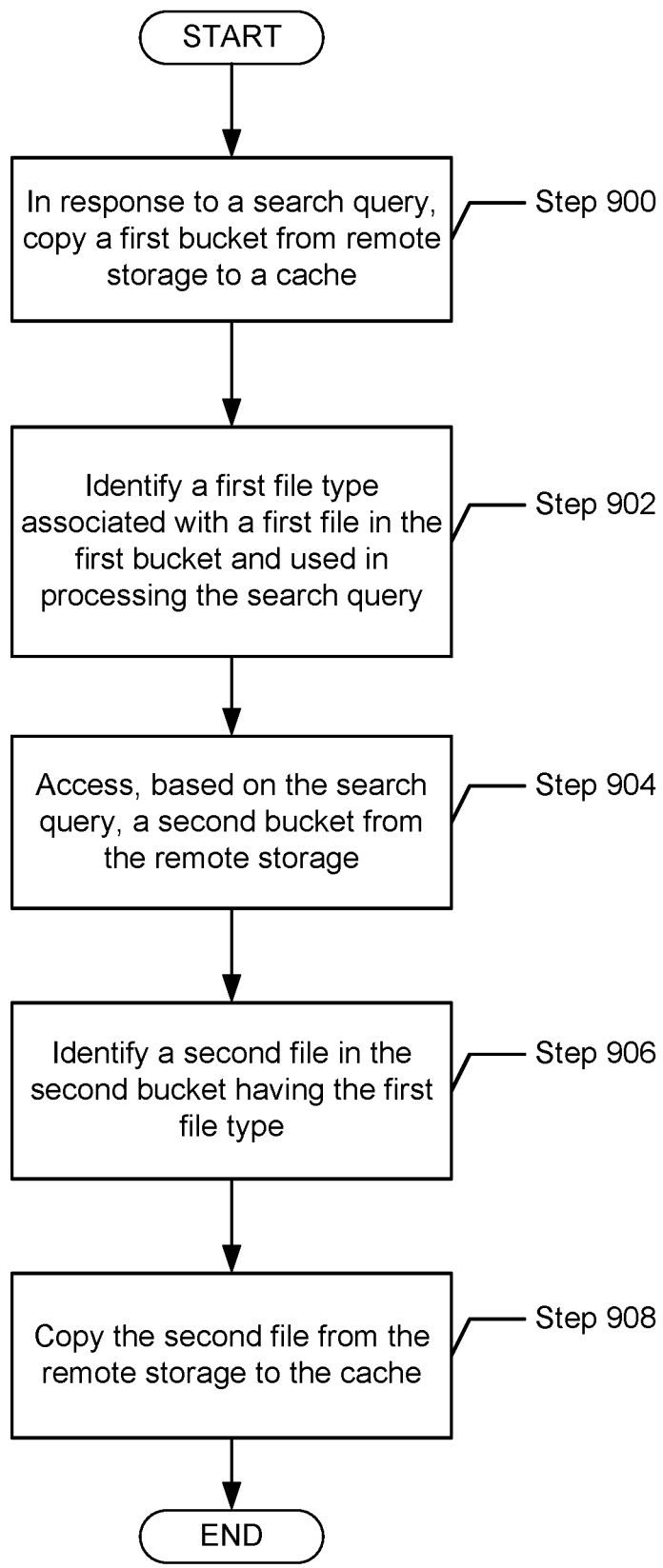
FIG. 9, FIG. 10, and FIG. 11 show flowcharts in accordance with one or more embodiments of the invention.

FIG. 9 shows a flowchart in accordance with one or more embodiments of the invention. The flowchart depicts a process for prefetching data. In one or more embodiments, the process described in reference to FIG. 9 may be practiced using one or more components described in reference to FIG. 1, FIG. 2, FIG. 6, FIG. 7, FIG. 8A, and FIG. 8B (e.g., the cache manager (800) described in reference to FIG. 8A and/or the search bucket predictor (850) described in reference to FIG. 8B). In one or more embodiments of the invention, one or more of the steps shown in FIG. 9 may be omitted, repeated, and/or performed in parallel, or in a different order than the order shown in FIG. 9. Accordingly, the scope of the invention should not be considered limited to the specific arrangement of steps shown in FIG. 9.

Initially, in Step 900, a first bucket is copied from remote storage to a cache in response to a search query. In one or more embodiments, the first bucket may be included in a list of buckets identified in response to the search query. For example, the list of buckets may be generated and/or received. By way of an additional example, when the search head receives a search request, the search head may generate the list of buckets that responds to the search request. The list of buckets may be generated using information from the indexer and/or determined based on a time range in the search query. In one or more embodiments of the invention, the cache manager may receive the list of buckets from the search head. Buckets may be processed to respond to the search query.

In Step 902, a first file type associated with a first file in the first bucket and used in processing the search query is identified. Examples of file types may include: metadata, Bloom filter, index, journal, raw data, etc. Processing the search query using the first file may yield one or more results. In one or more embodiments, a usage status of the first file may be assigned to indicate that the first file was used during the processing of the search query.

In Step 904, a second bucket from the remote storage is accessed, based on the search query. The second bucket may be included in the list of buckets. The second bucket may be a bucket that has been previously processed (e.g., by an indexer, search head or other search process executing a search request).

In Step 906, a second file is identified in the second bucket having the first file type. For example, both the first file and the second file may be index files. In one or more embodiments, the first file may be matched to the second file based on one or more matching criteria. An example of a matching criterion is whether the first file and the second file share the same file name or partial file name. Still another example of a matching criterion is whether the first file and the second file are associated with identical or similar search queries. Both files may be associated with an identical search query that was executed at different times (e.g., the search query may be a recurring query that is executed at periodic intervals). Alternatively, the first file the second file may be associated with similar search queries. For example, two search queries may be similar if they share a common sub-expression (e.g., "index x=foo").

In Step 908, the second file is copied from the remote storage to the cache. That is, the second file may be copied to the cache prior to being explicitly requested (e.g., by an indexer or search process executing a search request). In other words, the first file may be prefetched. In one or more embodiments, copying the second file is in response to identifying the first file type used in processing the search query in Step 902 above. In one or more embodiments, an entry in a cache map may be added to indicate the address of the second file in the cache. In one or more embodiments, the second file may be copied based on a rule that predicts the use of the second file based on the usage status of one or more files of one or more (e.g., previously processed) buckets. In one or more embodiments, the second bucket may be added to a bucket prefetch window.

Figure 10:
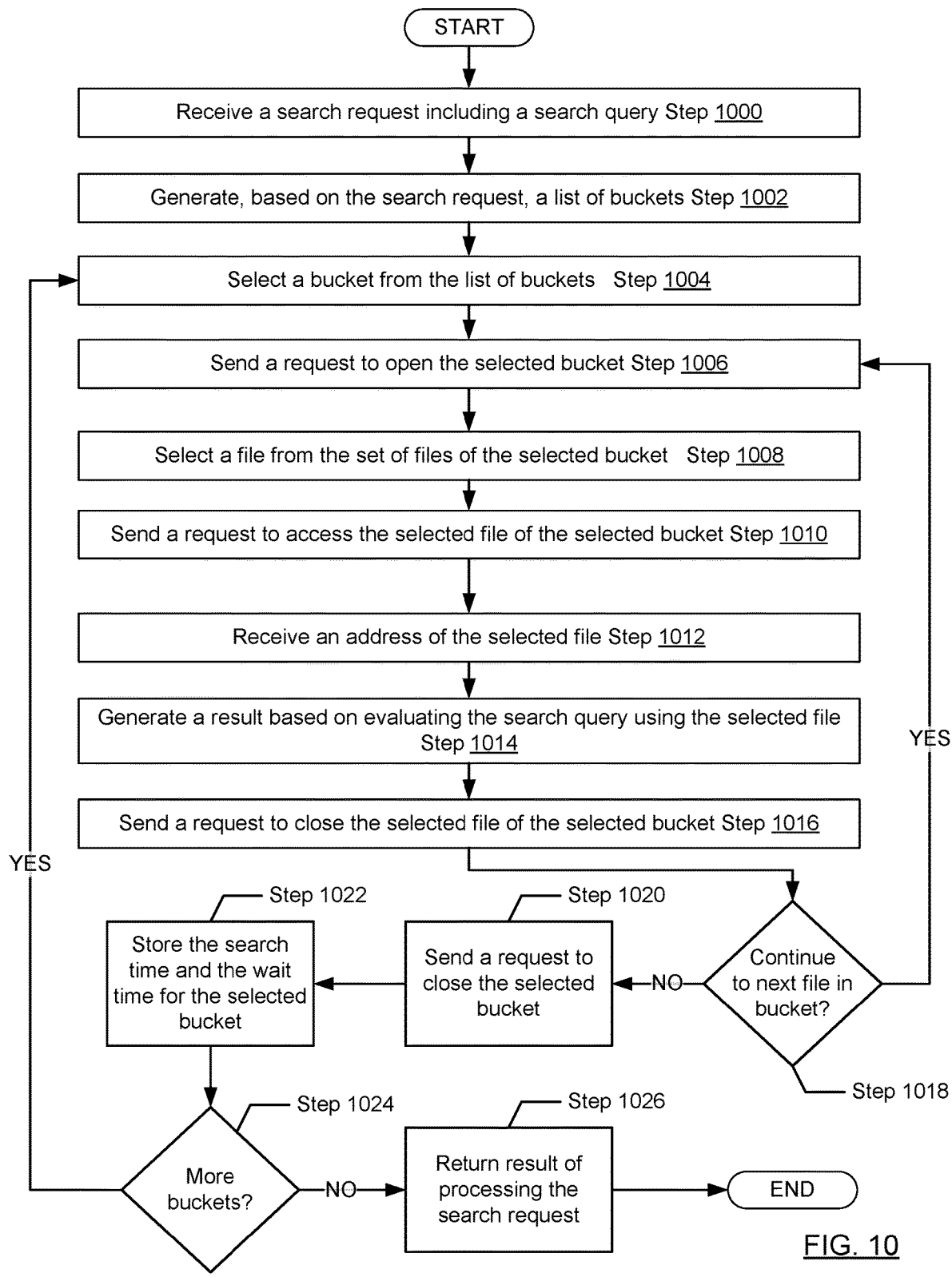

FIG. 10 shows a flowchart in accordance with one or more embodiments of the invention. The flowchart depicts a process for executing a search request. Moreover, the flowchart in FIG. 10 may correspond to Step 408 in FIG. 4. In one or more embodiments, the process described in reference to FIG. 10 may be practiced using one or more components described in reference to FIG. 1, FIG. 2, FIG. 6, FIG. 7, FIG. 8A, and FIG. 8B (e.g., the indexer (206) described in reference to FIG. 2). In one or more embodiments of the invention, one or more of the steps shown in FIG. 10 may be omitted, repeated, and/or performed in parallel, or in a different order than the order shown in FIG. 10. Accordingly, the scope of the invention should not be considered limited to the specific arrangement of steps shown in FIG. 10.

Initially, in Step 1000, a search request including a search query is received. In one or more embodiments, the search query may be represented in Splunk Processing Language (SPL). Alternatively, the search query may be represented in another query language, such as the Structured Query Language (SQL). In one or more embodiments, the search request may be received from a search head.

In Step 1002, a list of buckets is generated based on the search request. See description of Step 900 above. In one or more embodiments, each bucket of the list of buckets includes a set of files. In one or more embodiments, the files of one or more buckets in the list of buckets may be organized in an order in which the files may be processed to execute the search request.

In one or more embodiments, the list of buckets may be transmitted to a search process spawned by the indexer. For example, the search process may execute the search query relative to one or more buckets in the list of buckets. In one or more embodiments, the list of buckets may be transmitted to the cache manager (e.g., to trigger prefetching of one or more files of one or more buckets in the list of buckets).

The list of buckets may be ordered in order to process the search query. For example, a bucket ordering criterion may specify that the buckets in the list of buckets be examined based on time intervals associated with the buckets. An example is that the buckets in the list of buckets may be requested in reversed chronological order (e.g., where buckets corresponding to more recent time intervals are examined before examining buckets corresponding to less recent time intervals).

In Step 1004, a determination is made whether a file of a bucket in the list of buckets is present in the cache. In particular, when processing a previous search query, the file from at least one of the buckets may be present in the cache. If such a file is present, then the flow proceeds to Step 1006. In Step 1006, in response to the search query, a search is performed using the file already present in the cache based on the determination that the file is present in the cache. In other words, the file from the bucket may be processed out of order of the list of buckets. Thus, a file may be processed before other files in the same bucket or in a different bucket. Performing the search using a file is discussed in FIG. 10B below.

In one or more embodiments, the search is performed using the files that are already present in the cache. Thus, Step 1006 may be performed multiple times for each file that is already present in the cache.

In one or more embodiments, certain files may be used as a "gate" to determine whether to continue processing the selected bucket. For example, a metadata file may be used to determine whether further processing of the selected bucket relative to the search query is warranted (e.g., depending on whether a metadata field value specified in the search query is consistent with the metadata contained in the selected metadata file). Similarly, a Bloom filter may be used to determine whether further processing of the selected bucket relative to the search query is warranted. In addition, an index file may be used to determine whether further processing of the selected bucket relative to the search query is warranted (e.g., depending on whether a value specified in the search query is contained in the selected index file). A comparison may be performed on information in the gate file to determine whether to perform additional processing of the bucket. If the comparison indicates that the search query is not satisfied by the bucket, then the bucket is eliminated and remaining files are not processed in accordance with one or more embodiments of the invention. In contrast, if the comparison indicates that the search query may be satisfied, then the next file is processed.

By way of a more specific example, the metadata file may have a host name, a source name, and a source type of corresponding events in the bucket. In the more specific example, if at least one of the host name, source name, and source type does not match the search query, then the bucket does not need to be processed. In other words, the files that act as a gate allows for eliminating buckets from being processed. Once a bucket is eliminated, any remaining files are ignored and not downloaded.

Even though gate files may exist in remote storage, the gate files may not be used. For example, in some cases, the file that is already present in the cache is the larger file that has the events. In such a scenario, one or more embodiments determine a length of time to download, to the cache, the gate file. If the length of time to download the gate file is greater than a threshold, then the existing file in the cache is processed without downloading the gate file. For example, the threshold may be the time to process the existing file. By way of another example, the threshold may be the time to process the existing file with accounting for the likelihood that the bucket with the existing file would be processed. Thus, in a scenario in which heavy use of the cache exists such that waiting until downloading the metadata file is possible, the journal file may be processed without waiting for downloading the metadata file if the journal file is already present in the cache.

Continuing with FIG. 10, in Step 1008, a bucket is selected from the list of buckets. In one or more embodiments, the selected bucket may be based on a criterion for ordering the buckets in the list of buckets.

In Step 1010, a request is sent to open (i.e., access) the selected bucket. In one or more embodiments, the request may be sent to the cache manager.

In Step 1012, a file is selected from the set of files of the selected bucket. In one or more embodiments, the selected file may be based on a criterion for ordering the files in the set of files.

In Step 1014, a request is sent to access the selected file of the selected bucket. In one or more embodiments, the request may be sent to the cache manager. In one or more embodiments, a polling request may be periodically sent to follow up on the request to access the selected file (e.g., until the address of the selected file in the cache is available).

In Step 1016, an address of the selected file is received. In one or more embodiments, the address may refer to a location of the selected file in the cache.

In Step 1018, a result is generated based on evaluating the search query using the selected file. For example, if the selected file is a metadata file, then the search query may be evaluated relative to the metadata contained in the selected file to determine whether further processing of the first bucket relative to the search query is warranted. For example, if the search query specifies host=foo and the metadata contained in the selected file indicates that the host=bar, then no further processing of the first bucket relative to the search query is needed. In one or more embodiments, a usage status may be assigned to the selected file based on using the selected file to process the search query.

In Step 1020, a request is sent to close the selected file of the selected bucket. That is, the request indicates that access to the selected file is no longer required by the search process executing the search request. In one or more embodiments, the selected file may still be accessed by one or more other search processes executing other search requests. In some embodiments, files are eliminated from the bucket based on file size. In other words, larger files are eliminated from the bucket prior to smaller files.

In Step 1022, it is determined whether to continue processing the search request with another file in the set of the files of the selected bucket. That is, the result generated (in Step 1016 above) based on evaluating the search query relative to the selected file may be used as a gate that determines whether to continue processing the search request using additional files of the selected bucket. If Step 1022 determines to continue processing the selected bucket, then execution continues with Step 1010 above, with another selected file from the selected bucket. That is, the loop from Step 1010 to Step 1020 may be repeated with another selected file from the selected bucket. Alternatively, if Step 1022 determines to halt processing of the selected bucket, then Step 1024 below is performed. In one or more embodiments, processing of the selected bucket may be halted when each file in the set of files of the selected bucket has been used during the processing of the search request.

In Step 1024, a request is sent to close the selected bucket. That is, the request indicates that access to the selected bucket is no longer required by the search process executing the search request. For example, the search process may determine that it does not require access to any additional files of the set of files of the selected bucket. In one or more embodiments, the selected bucket may still be accessed by one or more other search processes executing other search requests. In one or more embodiments, the now-closed selected bucket may be removed from the bucket prefetch window.

The accumulation of stale buckets may be prevented by removing a bucket from the bucket prefetch window after a predetermined number of buckets subsequent to the prefetched bucket in the list of buckets have been processed (e.g., suggesting that the prefetched bucket is unlikely to be processed).

In Step 1026, the search time and the wait time for the selected bucket is stored. In one or more embodiments, the search time includes the processing time (e.g., CPU time) elapsed due to evaluating the search query using the selected file. In one or more embodiments, the search time for the selected bucket may be stored in the prefetch performance history entry corresponding to the selected bucket. In one or more embodiments, the search time for the selected bucket includes the search times for the files of the selected bucket that were used during the processing of the search request. In one or more embodiments, a request to store the search time for the selected bucket may be sent to the bucket predictor (e.g., to avoid potential contention or race conditions due to accessing the prefetch performance history).

In one or more embodiments, the wait time is the time that a search spends waiting for one or more files of the selected bucket to be copied from the remote storage to the cache. In one or more embodiments, the wait time for the selected bucket may be stored in the prefetch performance history entry corresponding to the selected bucket. The wait time may include the time due to a cache fault that occurs when a file needed for the search is not already resident in the cache. The wait time may also include the time due to waiting for a prefetched file to be copied into the cache. In one or more embodiments, the search time and the wait time for the selected bucket may be factors in determining whether to resize the bucket prefetch window (e.g., in Step 1318 of FIG. 13B below).

In Step 1028, it is determined whether to continue processing of the search request with another bucket in the list of buckets. If Step 1028 determines to continue processing another bucket, then execution continues with Step 1008 above, with another selected bucket. That is, the loop from Step 1008 to Step 1028 may be repeated for another selected bucket. Alternatively, if Step 1028 determines that there are no additional buckets to process, then Step 1030 below is performed.

In Step 1030, a result of processing the search request is returned. In one or more embodiments, the result may be returned to the requestor (e.g., a search head) of the search request received in Step 1000. In one or more embodiments, the result may be based on evaluating the search query relative to one or more files of one or more buckets in the bucket list generated in Step 1002 above.

Figure 11:
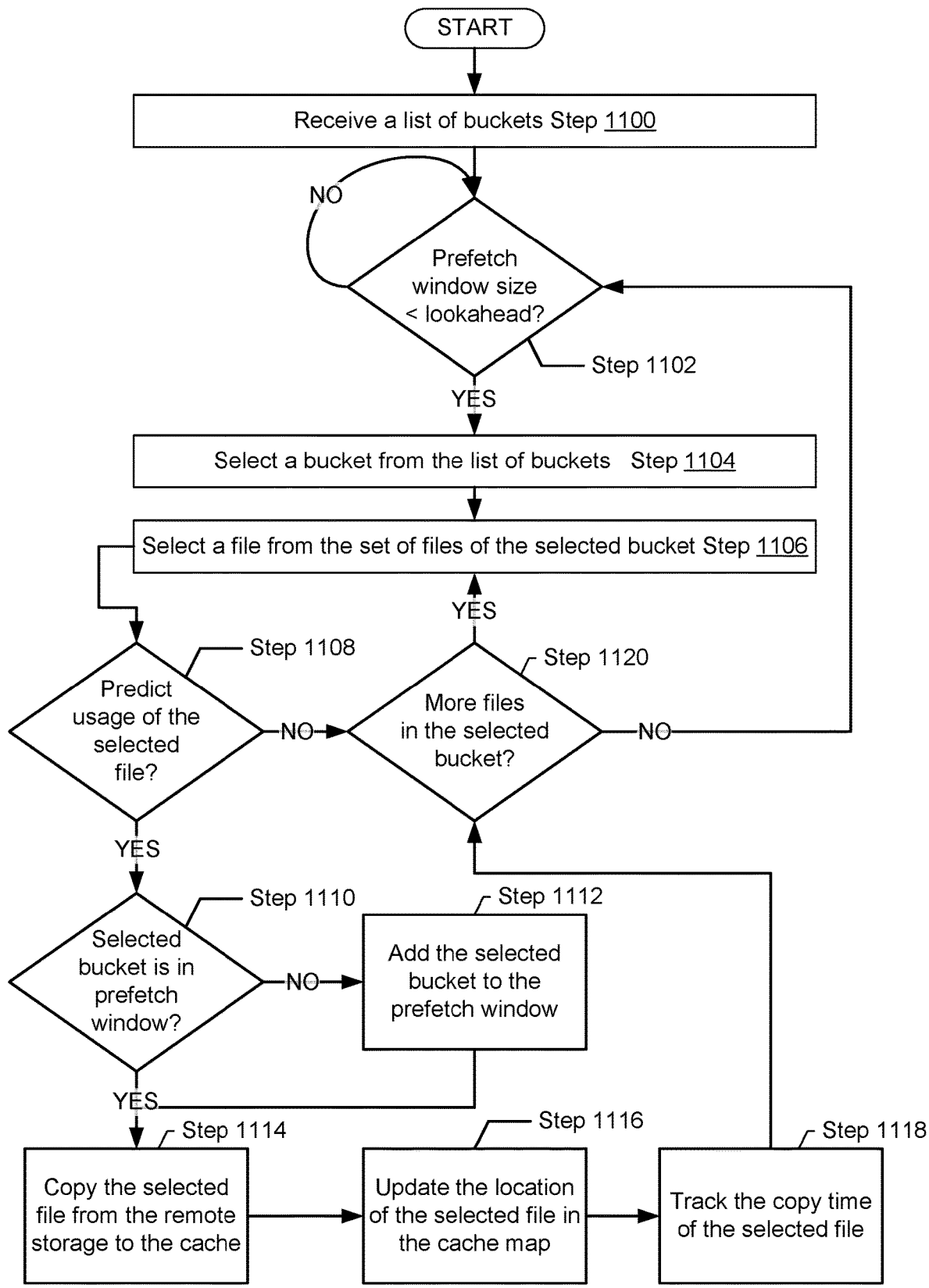

FIG. 11 shows a flowchart in accordance with one or more embodiments of the invention. The flowchart depicts a process for prefetching data. In one or more embodiments, the process described in reference to FIG. 11 may be practiced using one or more components described in reference to FIG. 1, FIG. 2, FIG. 6, FIG. 7, FIG. 8A, and FIG. 8B (e.g., the cache manager (800) described in reference to FIG. 8A and/or the search bucket predictor (850) described in reference to FIG. 8B). 800 In one or more embodiments of the invention, one or more of the steps shown in FIG. 11 may be omitted, repeated, and/or performed in parallel, or in a different order than the order shown in FIG. 11. Accordingly, the scope of the invention should not be considered limited to the specific arrangement of steps shown in FIG. 11.

Initially, in Step 1100, a list of buckets is received. In one or more embodiments, the list of buckets may be received from an indexer executing a search request.

In Step 1102, a wait loop checks whether a size of the bucket prefetch window is below a prefetch lookahead. In one or more embodiments, the prefetch lookahead is a target number of buckets to prefetch. In one or more embodiments, the bucket prefetch window may initially be empty. When the size of the bucket prefetch window is below the prefetch lookahead, execution proceeds to Step 1104 below. Otherwise, while the size of the bucket prefetch window is not below the prefetch lookahead, the wait loop continues.

In Step 1104, a bucket is selected from the list of buckets. In one or more embodiments, the selected bucket may be based on a criterion for ordering the buckets in the list of buckets. For example, a bucket ordering criterion may specify that the buckets in the list of buckets be examined based on time intervals associated with the buckets (e.g., where buckets corresponding to earlier time intervals are examined before examining buckets corresponding to later time intervals). In addition, the bucket ordering criterion may specify one or more initial buckets to prefetch. In one or more embodiments, the bucket ordering criterion may be received from an indexer (e.g., in Step 1100 above).

In Step 1106, a file is selected from the set of files of the selected bucket. See description of Step 1008 above.

In Step 1108, a prediction is made regarding the usage of the selected file. In one or more embodiments, the prediction is the basis for determining whether to prefetch the selected file. The prediction may be based on a usage history of matching files of one or more previously processed buckets. For example, the prediction may be based a usage status of one or more files having the same file type as the selected file, as indicated in the file usage history. The prediction may be based on one or more prediction rules. For example, a prediction rule may specify that if a journal file was used when processing a search request relative to at least one of the two buckets processed immediately prior to the selected bucket, then the journal file may be prefetched for the selected bucket. In one or more embodiments, various other rules may be used to determine whether to copy (i.e., prefetch) a file based on the usage status of one or more other buckets.

Continuing this non-limiting example, the prediction rule may further constrain the previously processed buckets to be buckets immediately preceding the selected bucket in the list of buckets. The prediction rule may further require that the usage status have a specified value (e.g., the value may be "used" or "not used") in a specified number of previously processed files.

Further continuing this non-limiting example, the specific number of previously processed files required may be a parameter that may be adjusted based on a measure of the accuracy of one or more previous predictions. For example, the accuracy measure may be based on how often a prefetched file (e.g., as indicated by a copy status of the file in the file usage history) was actually used during the processing of a search request.

As another non-limiting example, a prediction rule may automatically predict usage of the selected file when there is no usage status available for any files having the same file type as the selected file in previously processed buckets. For example, the selected bucket may be the first bucket in the list of buckets examined by the cache manager, so there may be no current data upon which to base a prediction.

If the usage of the selected file is predicted, then execution proceeds with Step 1110 below. Otherwise, if the usage of the selected file is not predicted, then execution proceeds with Step 1120 below.

In Step 1110, it is determined whether the selected bucket is in the bucket prefetch window. If the selected bucket is in the bucket prefetch window, then execution continues with Step 1114 below.

If the selected bucket is not in the bucket prefetch window, then in Step 1112 the selected bucket is added to the bucket prefetch window (e.g., the selected file is the first file of the selected bucket to be prefetched). The size of the bucket prefetch window therefore expands by one. In one or more embodiments, the bucket prefetch window includes a reference to each bucket that contains at least one prefetched file.

In Step 1114, the selected file is copied from the remote storage to the cache. See description of Step 908 above. In one or more embodiments, while waiting for the selected file to be copied, another iteration of the loop beginning with Step 1106 and ending with Step 1120 may be executed, to determine whether another file in the selected bucket may be a candidate for prefetching. In one or more embodiments, while waiting for the selected file to be copied, another iteration of the wait loop in Step 1102 above may be executed, to determine whether one or more files in other buckets may be additional candidates for prefetching.

In Step 1116, the location of the selected file is updated in a cache map. That is, the location of the selected file in the cache map may be updated to indicate the cache address corresponding to the location of the selected file in the cache (e.g., instead of a remote storage address).

In Step 1118, the wait time of the selected file is tracked. In one or more embodiments, the wait time is the time taken to copy the selected file from the remote storage to the cache.

In Step 1120, it is determined whether there are additional files of the set of files of the selected bucket. If there are additional files, then execution proceeds with Step 1106 above, to select another candidate file for prefetching. In one or more embodiments, each file of the set of files of the selected bucket may be considered, in turn, as a candidate for prefetching. If there are no additional files, then execution then proceeds with the wait loop in Step 1102 above (e.g., to wait until the size of the prefetch window falls below the prefetch lookahead). In one or more embodiments, the selected file may be used as a "gate" to determine whether to consider additional files of the selected bucket as candidates for prefetching. For example, if Step 1108 above predicts that an index file of the selected bucket will not be used to process the search query, and therefore the index file is not prefetched, then it may be determined that a journal file of the selected bucket should also not be prefetched.

Figure 12:
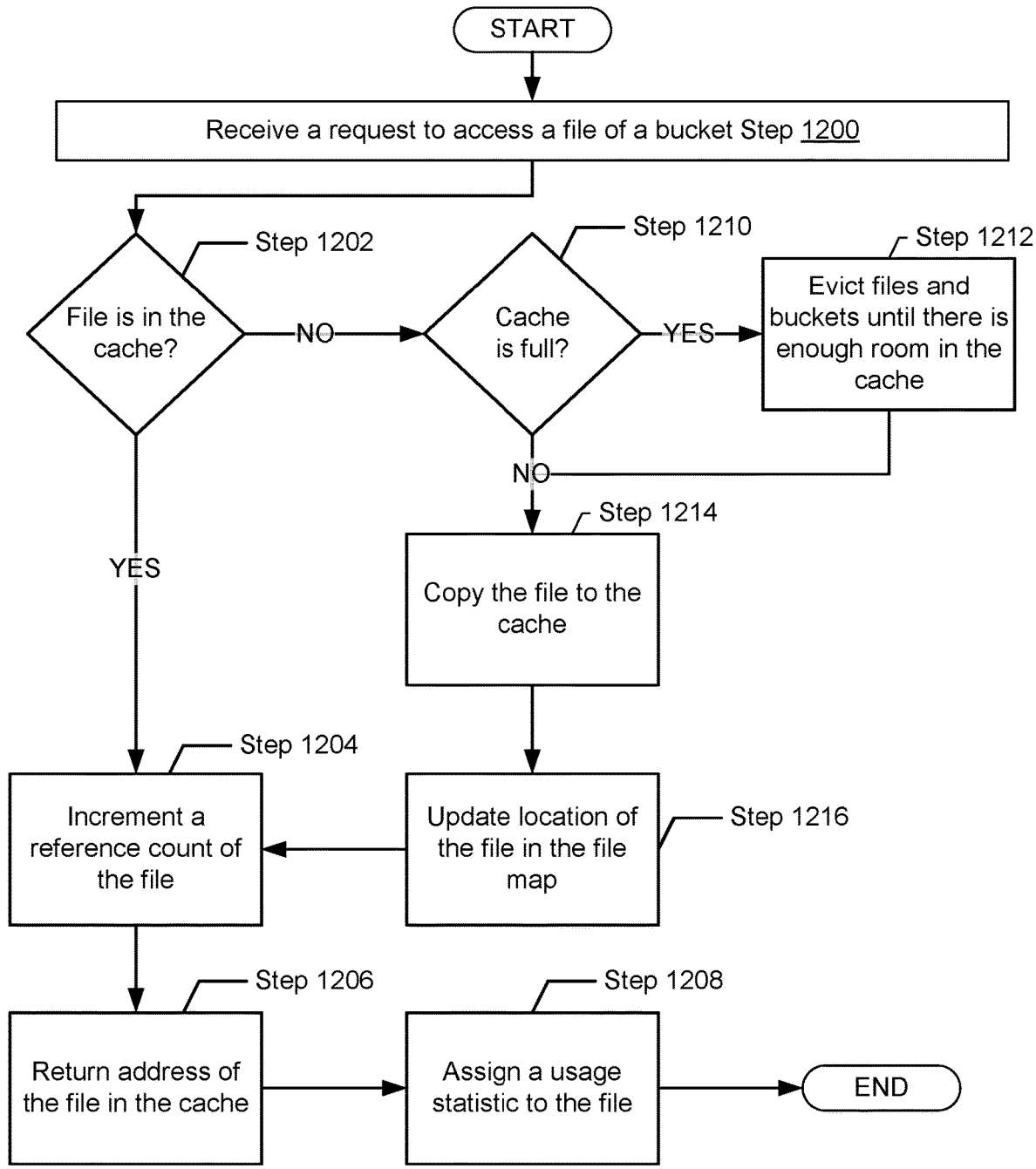
FIG. 12, FIG. 13A and FIG. 13B show flowcharts in accordance with one or more embodiments of the invention.

FIG. 12 shows a flowchart in accordance with one or more embodiments of the invention. The flowchart depicts a process for handling a request to access a file of a bucket. In one or more embodiments, the process described in reference to FIG. 12 may be practiced using one or more components described in reference to FIG. 1, FIG. 2, FIG. 6, FIG. 7, FIG. 8A, and FIG. 8B (e.g., the cache manager (800) described in reference to FIG. 8A and/or the search bucket predictor (850) described in reference to FIG. 8B). In one or more embodiments of the invention, one or more of the steps shown in FIG. 12 may be omitted, repeated, and/or performed in parallel, or in a different order than the order shown in FIG. 12. Accordingly, the scope of the invention should not be considered limited to the specific arrangement of steps shown in FIG. 12.

Initially, in Step 1200, a request to access a file of a bucket is received. In one or more embodiments, the request may be received from an indexer executing a search request (e.g., in Step 1010 above).

In Step 1202, it is determined whether the file is in the cache. In one or more embodiments, the cache map may be consulted to determine whether an entry corresponding to the file exists in the cache. If the file is in the cache, then in Step 1204 a reference count of the file is incremented. For example, a reference count greater than zero may indicate that the file is being referenced by at least one executing process (e.g., the originator of the request received in Step 1200), and therefore should not be evicted from the cache.

In Step 1206, the address of the file in the cache is returned to the originator of the request received in Step 1200.

In Step 1208, a usage status is assigned to the file. In one or more embodiments, the usage status may indicate that access to the file has been requested (e.g., by an indexer executing a search query in Step 1008 above). For example, the usage status may indicate a value of "used". Alternatively, the usage status may have a numerical value based on the number of times the file has been accessed. In one or more embodiments, the usage status may be stored in an entry in a file usage history corresponding to the file.

Alternatively, if Step 1202 determines that the file is not in the cache, then in Step 1210 it is determined whether the cache is full. If the cache is full, then in Step 1212 one or more cached files may be evicted until sufficient room exists in the cache to store the file. In one or more embodiments, the size of the file may be obtained from the entry in the cache map corresponding to the file. In one or more embodiments, the evicted files may have a reference count of zero (e.g., the evicted files are no longer being accessed by any process executing a search request).

In Step 1214, the file is copied from the remote storage to the cache. See description of Step 904 above.

In Step 1216, the location of the file is updated in the cache map. That is, the location of the file in the entry in the cache map corresponding to the file may be updated to indicate the cache address corresponding to the location of the file in the cache (e.g., instead of a remote storage address). After Step 1216 is performed, execution then proceeds with Step 1204 above.

Figure 13A:
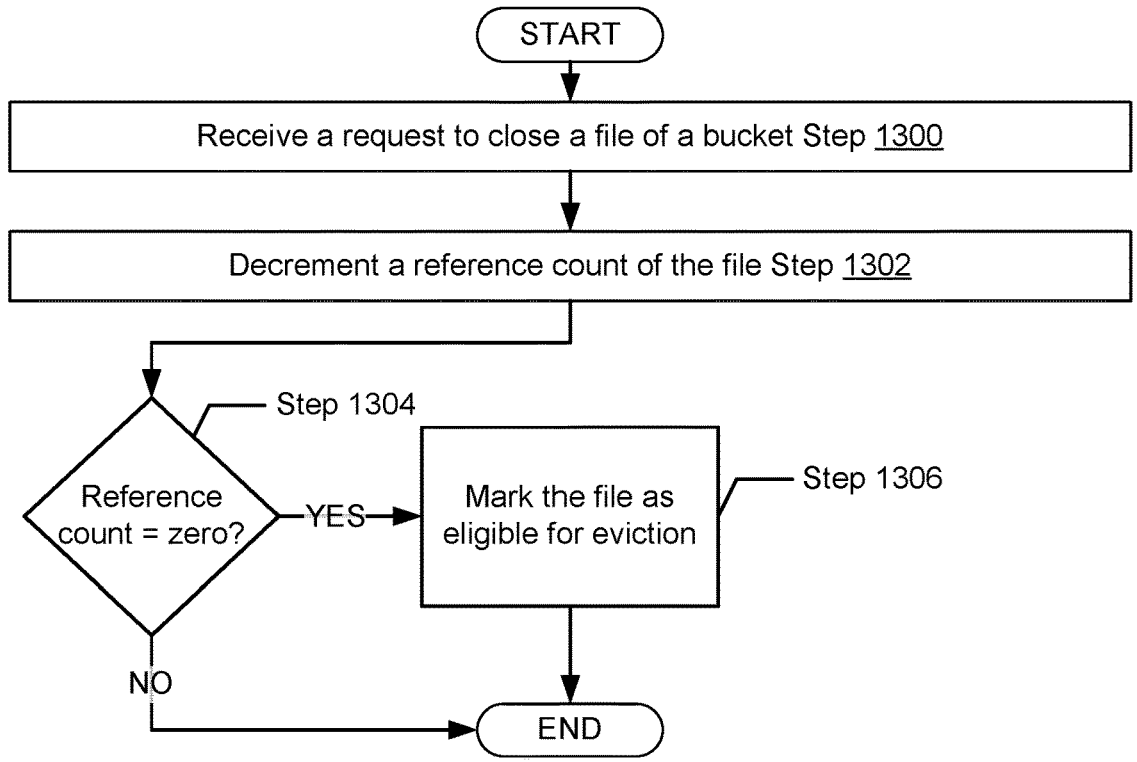

FIG. 13A shows a flowchart in accordance with one or more embodiments of the invention. The flowchart depicts a process for handling a request to close a file of a bucket. In one or more embodiments, the process described in reference to FIG. 13A may be practiced using one or more components described in reference to FIG. 1, FIG. 2, FIG. 6, FIG. 7, FIG. 8A, and FIG. 8B (e.g., the cache manager (800) described in reference to FIG. 8A and/or the search bucket predictor (850) described in reference to FIG. 8B). In one or more embodiments of the invention, one or more of the steps shown in FIG. 13A may be omitted, repeated, and/or performed in parallel, or in a different order than the order shown in FIG. 13A. Accordingly, the scope of the invention should not be considered limited to the specific arrangement of steps shown in FIG. 13A.

Initially, in Step 1300, a request to close (i.e., release access to) a file of a bucket is received. In one or more embodiments, the request may be received from an indexer executing a search request (e.g., in Step 1016 above).

In Step 1302, a reference count of the file is decremented. In one or more embodiments, the reference count is used to determine when the file may be safely evicted from the cache. For example, a reference count of zero may indicate that no process requires access to the file.

If, in Step 1304, it is determined that the reference count of the file is zero, then in Step 1306 the file is marked for eviction from the cache. That is, the file may be evicted from the cache if additional space is required in the cache (e.g., to make room for additional prefetched files of other buckets).

Figure 13B:
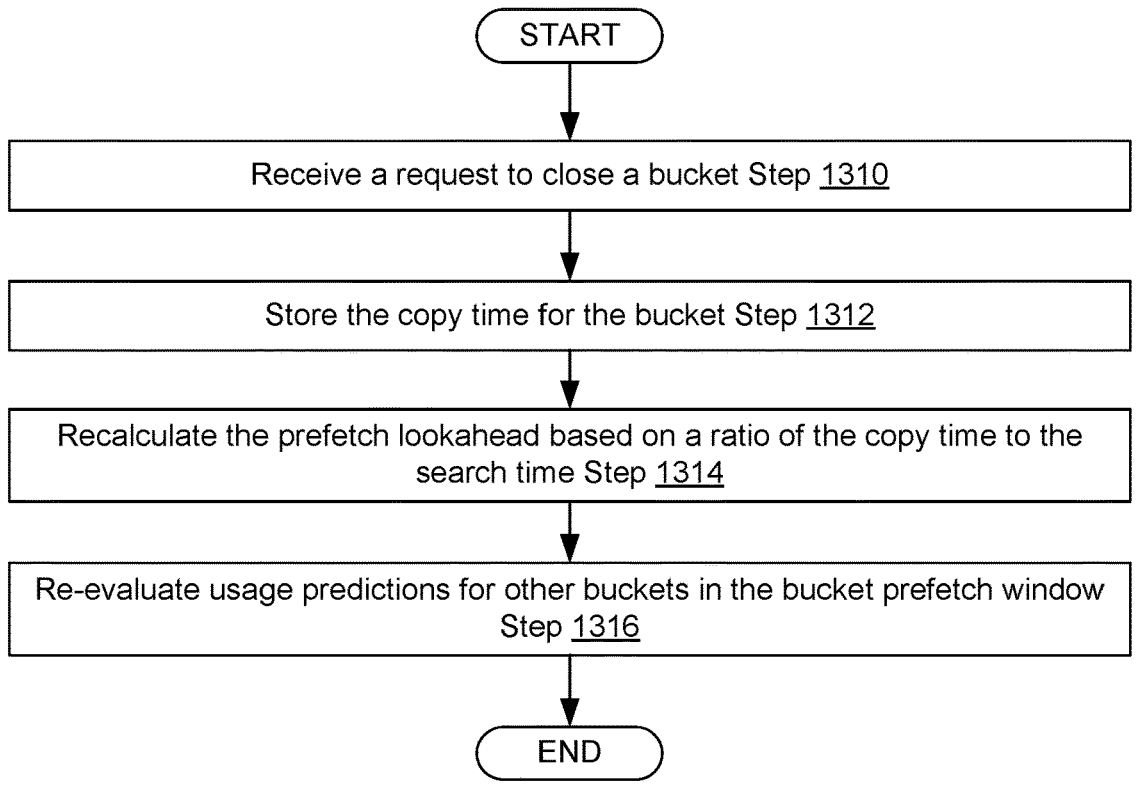

FIG. 13B shows a flowchart in accordance with one or more embodiments of the invention. The flowchart depicts a process for handling a request to close a bucket. In one or more embodiments, the process described in reference to FIG. 13B may be practiced using one or more components described in reference to FIG. 1, FIG. 2, FIG. 6, FIG. 7, FIG. 8A, and FIG. 8B (e.g., the cache manager (800) described in reference to FIG. 8A and/or the search bucket predictor (850) described in reference to FIG. 8B). In one or more embodiments of the invention, one or more of the steps shown in FIG. 13B may be omitted, repeated, and/or performed in parallel, or in a different order than the order shown in FIG. 13B. Accordingly, the scope of the invention should not be considered limited to the specific arrangement of steps shown in FIG. 13B.

Initially, in Step 1310, a request to close (i.e., release access to) a bucket is received. In one or more embodiments, the request may be received from an indexer executing a search request (e.g., in Step 1020 above).

In Step 1312, the wait time for the bucket is stored. In one or more embodiments, the wait time for the bucket may be stored in the prefetch performance history entry corresponding to the bucket. In one or more embodiments, the wait time for the bucket includes the wait times for the files of the bucket that were copied during the processing of the search request and/or the wait times for the files of the bucket that were prefetched (e.g., in Step 1114 above).

In Step 1314, the prefetch lookahead is recalculated based on a ratio of the wait time to the search time. In one or more embodiments, the target size of the bucket prefetch window, as represented by the prefetch lookahead, may be proportional to the amount of copying performed for the files of the bucket. That is, when the wait time per bucket is large, it may become more important to have a large buffer of prefetched files for a search process (e.g., performed by an indexer) to work on in parallel with waiting for the non-prefetched files to be copied to the cache. In one or more embodiments, the prefetch lookahead may be calculated based on a ratio of the wait time to the search time, averaged for a predetermined number of recently closed buckets.

In one or more embodiments, the recalculated prefetch lookahead may trigger additional prefetching in Step 1102 above in the method of FIG. 11 (e.g., if the recalculated prefetch lookahead now exceeds the size of the bucket prefetch window). Recalculating the prefetch lookahead when a bucket is closed provides a feedback mechanism that expands and shrinks the size of the bucket prefetch window based on the amount of copying relative to the amount of searching for the closed bucket. For example, a larger-sized bucket prefetch window may reduce the amount of copying needed in the near term (e.g., due to the greater number of prefetched files resulting from the larger bucket prefetch window), thereby causing the bucket prefetch window to shrink when the prefetch lookahead is next recalculated. However, a smaller bucket prefetch window may increase the likelihood of cache misses, which may increase the amount of copying, thereby causing the bucket prefetch window to expand when the prefetch lookahead is next recalculated, etc.

In Step 1316, usage predictions for other buckets in the bucket prefetch window are re-evaluated. In one or more embodiments, the usage status of the files in the now-closed bucket may be used to re-evaluate prior usage predictions made in Step 1108 above of FIG. 11 for one or more files in one or more buckets remaining in the bucket prefetch window. For example, a prior prediction that an index file of a Bucket B in the prefetch window would not be used may have resulted in a decision not to prefetch the index file of Bucket B. This prediction may be reconsidered in light of the usage of the index file of the now-closed bucket during the processing of the search query, which may trigger prefetching the index file of Bucket B in Step 1114 above of FIG. 11.

3.4. Examples

Figure 14A:
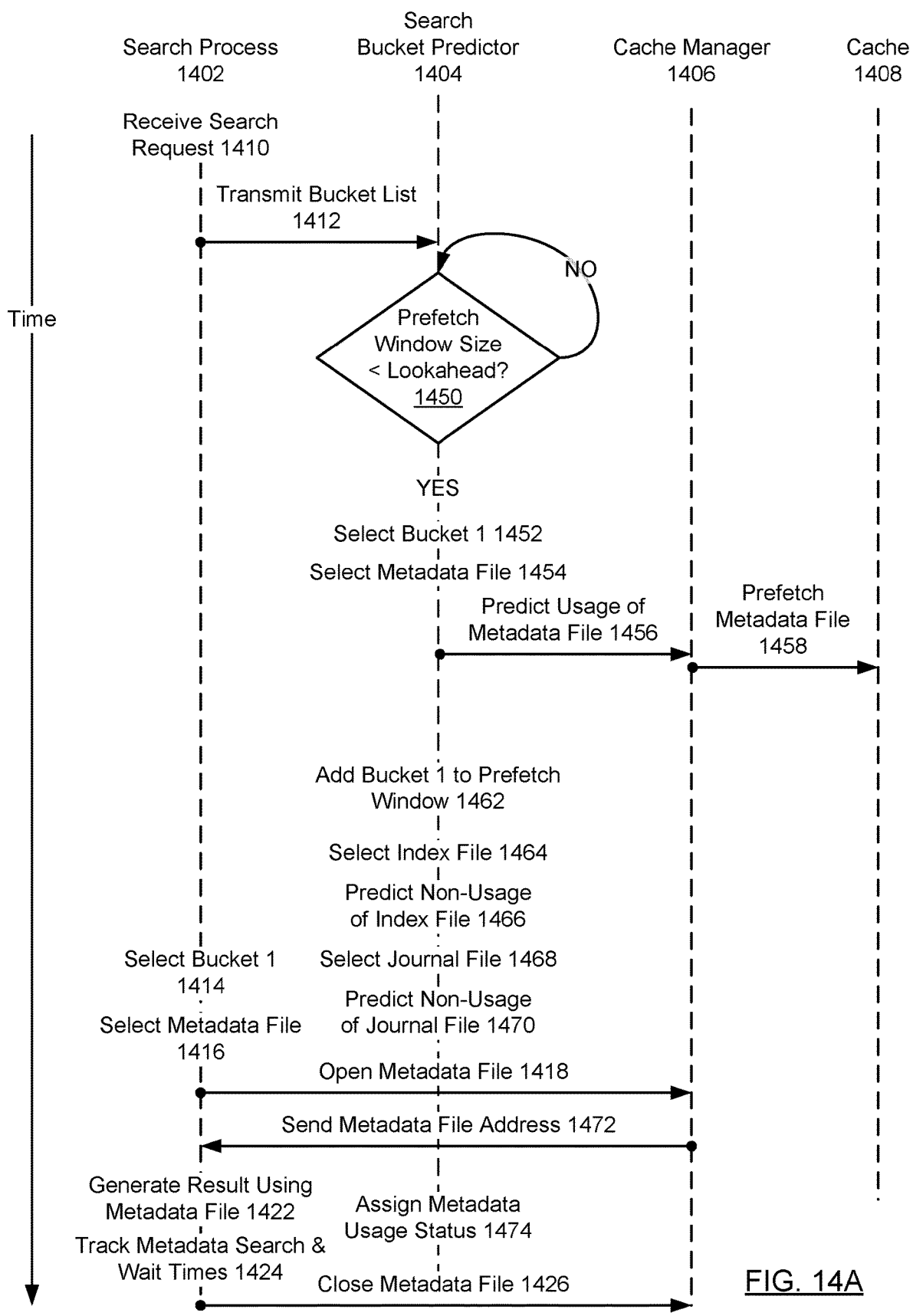
FIG. 14A, FIGS. 14B, and 15 show examples in accordance with one or more embodiments of the invention.
Figure 14B:
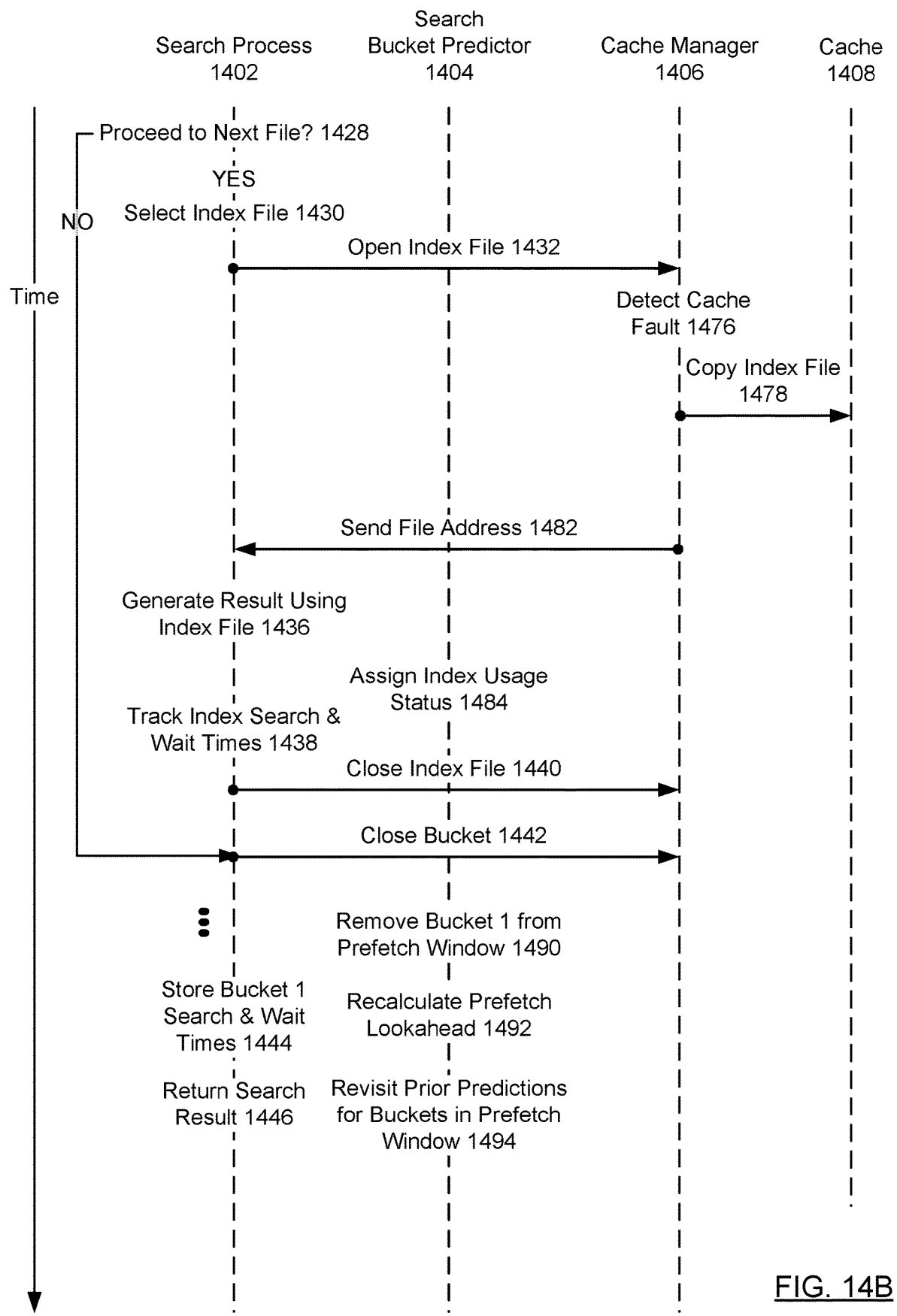

The following example is for explanatory purposes only and not intended to limit the scope of the invention. FIG. 14A and FIG. 14B show an implementation example in accordance with one or more embodiments of the invention. FIG. 14A and FIG. 14B illustrate, in accordance with one or more embodiments, the relative timing of steps performed by one or more components described in reference to FIG. 1, FIG. 2, FIG. 6, FIG. 7, FIG. 8A, and FIG. 8B, in accordance with the flowcharts in FIG. 3, FIG. 4, FIG. 9, FIG. 10, FIG. 11, FIG. 12, FIG. 13A, and FIG. 13B. These components include: a search process (1402) (e.g., created by an indexer (206) in FIG. 2), the search bucket predictor (1404) ((850) in FIG. 8B), the cache manager (1406) ((800) in FIG. 8A), and the cache (1408) ((830) in FIG. 8A). One or more of the steps performed by the various components may proceed concurrently.

Initially, in Step 1410, the search process (1402) receives a search request (e.g., from a search head (210) in FIG. 2) including a search query, called Query 24. Query 24 may be represented in Splunk Processing Language (SPL) or in another query language.

In Step 1412, the search process (1402) generates a list of buckets based on Query 24, and transmits the list of buckets to a search process spawned by the search process (1402). The search process may in turn transmit the list of buckets to the search bucket predictor (1404). In this example, the search process (1402) is already in the midst of executing several other search queries (e.g., Query 1 thru Query 23), and resumes execution of these other search queries. That is, the search process (1402) defers execution of Query 24 in order to give the cache manager (1406) time to prefetch files that may be needed to execute Query 24.

Turning to the search bucket predictor (1404), in Step 1450, upon obtaining the list of buckets from the search process (1402), the search bucket predictor (1404) begins the process of determining which files in the list of buckets should be prefetched, based on predictions regarding which files are likely to be needed to execute Query 24. The search bucket predictor (1404) checks, in a wait loop, whether the bucket prefetch window size is less than the prefetch lookahead. In an initial scenario, where the search bucket predictor (1404) has just received the list of buckets in Step 1412 above, the bucket prefetch window is empty, and the prefetch lookahead is set to 2. Therefore, the search bucket predictor (1404) proceeds to Step 1452, and selects a bucket, in this case Bucket 1, from the list of buckets. For example, Bucket 1 may be selected because Bucket 1 is a bucket that has not yet been examined by the search bucket predictor (1404) and Bucket 1 corresponds to the earliest time interval relative to the other unexamined buckets in the bucket list.

In Step 1454, search bucket predictor (1404) selects a file of Bucket 1, in this case the metadata file, from the set of files of Bucket 1. For example, the metadata file may be selected because the metadata file is typically a very small file, and it may be used to quickly rule out a bucket from further processing of a search query. The set of files in Bucket 1 also includes an index file and a journal file.

In Step 1456, search bucket predictor (1404) makes a prediction that the metadata file will be used during the execution of Query 24 relative to Bucket 1. The search bucket predictor (1404) transmits the prediction to the cache manager (1406). This prediction is based on the lack of any usage status in a file usage history for any metadata files in previously processed buckets (i.e., Bucket 1 is the first bucket processed for Query 24). Therefore, based on the prediction, the cache manager (1406) prepares to prefetch the metadata file of Bucket 1.

In an alternate scenario, Bucket 1 is not the first bucket processed in the list of buckets. In this alternate scenario, Bucket X and Bucket Y have been processed immediately prior to Bucket 1. A usage status exists in the file usage history for the metadata files in Bucket X and Bucket Y. In both Bucket X and Bucket Y, the metadata file was used during the processing of Query 24, while in Bucket Y, the metadata file was not used during the processing of Query 24 (e.g., Bucket Y contained a Bloom filter which was used to rule out further processing of Bucket Y relative to Query 24). In the alternate scenario, the search bucket predictor (1404) uses a prediction rule that predicts usage of a file based on a usage status of "used" in at least one of the immediately preceding buckets of the same file type. Therefore, in the alternate scenario, the search bucket predictor (1404) also predicts, in Step 1456, that the metadata file will be used during the execution of Query 24 relative to Bucket 1. Therefore, in both the original scenario and the alternate scenario, the search bucket predictor (1404) prepares to prefetch the metadata file of Bucket 1.

In Step 1458, the cache manager (1406), based on the prediction by the search bucket predictor (1404) in Step 1456, copies the metadata file of Bucket 1 from the remote storage to the cache (1408). The cache manager (1406) also updates the location of the metadata file in the cache map to indicate the cache address corresponding to the location of the metadata file in the cache (1408).

In Step 1462, the search bucket predictor (1404) adds Bucket 1 to the bucket prefetch window. Bucket 1 was not already in the bucket prefetch window because the metadata file is the first file prefetched from Bucket 1.

Next, the search bucket predictor (1404) considers the remaining files of Bucket 1 as candidates for prefetching. In Step 1464, the search bucket predictor (1404) selects the index file of Bucket 1.

In Step 1466, search bucket predictor (1404) makes a prediction that the index file of Bucket 1 will not be used during the execution of Query 24 relative to Bucket 1. For example, in the alternate scenario mentioned in Step 1456 above, Bucket X and Bucket Y of the list of buckets have been processed immediately prior to processing Bucket 1. The prediction regarding the index file of Bucket 1 is based on a usage status in the file usage history for index files in Bucket X and Bucket Y, neither of which used the index file during the processing of Query 24. Therefore, the index file of Bucket 1 is not prefetched.

In Step 1468, the search bucket predictor (1404) selects the journal file of Bucket 1.

In Step 1470, search bucket predictor (1404) makes a prediction that the journal file of Bucket 1 will not be used during the execution of Query 24 relative to Bucket 1. The prediction regarding the journal file of Bucket 1 is based on a usage status in the file usage history for index files in Bucket X and Bucket Y, neither of which used the journal file during the processing of Query 24. Therefore, the journal file of Bucket 1 is not prefetched.

Now that each file of Bucket 1 has been examined as a candidate for prefetching, the search bucket predictor (1404) stores the wait time for Bucket 1 (e.g., in the prefetch performance history entry corresponding to Bucket 1). The wait time for Bucket 1 is 100 milliseconds (i.e., the wait time for the metadata file copied in Step 1458 above).

Returning to the search process (1402), upon resuming its focus on Query 24, in Step 1414, the search process (1402) selects Bucket 1 from the list of buckets (e.g., the bucket corresponding to the earliest time interval). The search process (1402) may spawn a separate search process to execute Query 24 relative to Bucket 1.

In Step 1416, a search process spawned by the search process (1402) selects the metadata file from the set of files of Bucket 1 (e.g., because the metadata file may be used to quickly rule out Bucket 1 for further processing of Query 24).

In Step 1418, the search process (1402) sends a request to the cache manager (1406) to open (i.e., access) the metadata file of Bucket 1. The search process (1402) periodically polls the cache manager (1406) regarding the status of this request.

In Step 1472, in response to the request of the search process (1402) in Step 1418 above, the cache manager (1406) sends the cache address of the metadata file of Bucket 1 to the search process (1402).

In Step 1474, the search bucket predictor (1404) assigns a usage status of "used" to the metadata file of Bucket 1, now that the metadata file has actually been opened in Step 1418 above. The usage status for the metadata file of Bucket 1 is stored in an entry in the file usage history corresponding to the metadata file of Bucket 1. The usage status may subsequently be used by the search bucket predictor (1404) to predict whether the metadata files of subsequent buckets are likely to be used during the processing of Query 24. The search bucket predictor (1404) increments the reference count of the metadata file.

Returning to the search process (1402), in Step 1422, the search process (1402) generates a result of evaluating Query 24 using the metadata file of Bucket 1. In this case, the result is that Bucket 1 does satisfy a metadata expression specified in Query 24. This is because Query 24 specifies that the host field contain the value "server0001", and the metadata file corresponding to Bucket 1 indicates that Bucket 1 does contain data corresponding to a host field with the value "server0001".

In Step 1424, the search process (1402) tracks the time to use the metadata file to search Bucket 1 relative to Query 24 in Step 1422 above. The search time is 15 milliseconds. The search process (1402) also tracks the time spent waiting for the metadata file of Bucket 1. Since the metadata file was already prefetched, the wait time is only 10 milliseconds.

In Step 1426, the search process (1402) sends a request to the cache manager (1406) to close the metadata file of Bucket 1, now that the search process (1402) has completed its use of the metadata file. Upon receiving this request, the cache manager (1406) decrements the reference count of the metadata file (e.g., once the reference count reaches zero, the metadata file may be a candidate for eviction from the cache (1408), in order to free up space to store other files).

Turning to FIG. 14B, which continues the timing diagram of FIG. 14A, in Step 1428, the search process (1402) determines whether to continue executing Query 24 using another file in the set of the files of Bucket 1. That is, the result generated (in Step 1422 above) based on evaluating Query 24 relative to the metadata file is used as a gate to determine whether to continue processing the search request using additional files of Bucket 1. In this case, the search process (1402) determines to continue searching Bucket 1, and performs Step 1430 below. Alternatively, if the search process (1402) had determined to discontinue searching Bucket 1, then the search process (1402) would next perform Step 1442 below, to close Bucket 1.

In Step 1430, the search process (1402) selects the index file from the set of files of Bucket 1. For example, the index file may be selected because the index file may be used to quickly rule out the need to use the journal file of Bucket 1, if the result of evaluating Query 24 using the index returns an empty result.

In Step 1432, the search process (1402) sends a request to the cache manager (1406) to open the index file of Bucket 1.

However, in Step 1476, the cache manager (1406) detects a cache fault, since the index file of Bucket 1 was not prefetched to the cache (1408). Therefore, the prediction made by the search bucket predictor (1404) in Step 1466 above, that the index file of Bucket 1 would not be used to process Query 24, was incorrect. The search process (1402) will now be forced to wait for the cache manager (1406) to copy the index file to the cache (1408).

In Step 1478, the cache manager (1406) copies the index file of Bucket 1 from the remote storage to the cache (1408). The cache manager (1406) also updates the location of the index file of Bucket 1 in the cache map to indicate the cache address corresponding to the location of the metadata file in the cache (1408).

In Step 1482, the cache manager (1406) sends the cache address of the index file of Bucket 1 to the search process (1402).

In Step 1484, the search bucket predictor (1404) assigns a usage status of "used" to the index file of Bucket 1. The usage status for the index file of Bucket 1 is stored in an entry in the file usage history corresponding to the index file of Bucket 1. The cache manager (1406) increments the reference count of the index file.

Returning to the search process (1402), in Step 1436, the search process (1402) generates a result of evaluating Query 24 using the index file of Bucket 1. In this case, the result is that the index file of Bucket 1 does not contain a keyword specified in Query 24. Therefore, processing of Bucket 1 relative to Query 24 is aborted. The journal file of Bucket 1 is not needed to process Query 24. Therefore, the prediction made by the search bucket predictor (1404) in Step 1470 above, that the journal file of Bucket 1 would not be used to process Query 24, was correct.

In Step 1438, the search process (1402) tracks the time to use the index file to search Bucket 1 relative to Query 24 in Step 1436 above. The search time is 35 milliseconds. The search process (1402) also tracks the time spent waiting for the index file of Bucket 1. Since the index file was not already resident in the cache (1408), a cache fault occurred, and the wait time was 240 milliseconds.

In Step 1440, the search process (1402) sends a request to the cache manager (1406) to close the index file of Bucket 1, now that the search process (1402) has completed its use of the index file. Upon receiving this request, the cache manager (1406) decrements the reference count of the index file.

In Step 1442, the search process (1402) sends a request to the cache manager (1406) to close Bucket 1, now that the search process (1402) has completed its processing of Bucket 1. The search process (1402) stores the search time for Bucket 1 (e.g., in the prefetch performance history entry corresponding to Bucket 1). The search time for Bucket 1 is 50 milliseconds (i.e., the sum of the search times for the metadata file and the index file during the processing of Query 24). Alternatively, the search process (1402) may request that the search bucket predictor (1404) store the search time for Bucket 1 (e.g., to avoid potential contention or race conditions due to accessing the prefetch performance history).

In response to the request of the search process (1402) to close Bucket 1 in Step 1442 above, in Step 1490, the search bucket predictor (1404) removes Bucket 1 from the bucket prefetch window, since Bucket 1's files no longer count as prefetched files that are predicted to be used during future processing of Query 24. The size of the bucket prefetch window shrinks by one.

In Step 1492, the search bucket predictor (1404) recalculates the prefetch lookahead based on the ratio of the wait time for Bucket 1 to the search time for Bucket 1. The wait time for Bucket 1 is 250 milliseconds (i.e., the sum of the wait times for the metadata file and the index file). The search time for Bucket 1 is 50 milliseconds (i.e., the sum of the search times for the metadata file and the index file). The ratio of the ratio of the wait time to the search time for Bucket 1 is 5. Therefore, the target size of the bucket prefetch window, as represented by the prefetch lookahead, is set to 5. The recalculated prefetch lookahead may trigger the cache manager (1406) to perform additional prefetching of files in the buckets of the list of buckets in the wait loop of Step 1450 above, depending on the current size of the bucket prefetch window.

In Step 1494, the search bucket predictor (1404) may re-evaluate (e.g., in the alternate scenario) prior usage predictions for other buckets in the bucket prefetch window. That is, the usage status of the metadata and index files of Bucket 1 may be used to reverse prior usage predictions made for metadata and/or index files in one or more buckets currently in the bucket prefetch window, potentially triggering the prefetching of the metadata and/or index files of these other buckets.

In Step 1444, the search process (1402) stores the search time and the wait time for Bucket 1 in the prefetch performance history.

The search process (1402) then continues its processing of Query 24 relative to additional buckets in the list of buckets. Once all of the buckets in the list of buckets have been processed, the search process (1402) returns the result of evaluating Query 24 relative to the list of buckets in Step 1446 (e.g., to the requestor of the search request received in Step 1410).

Figure 15:
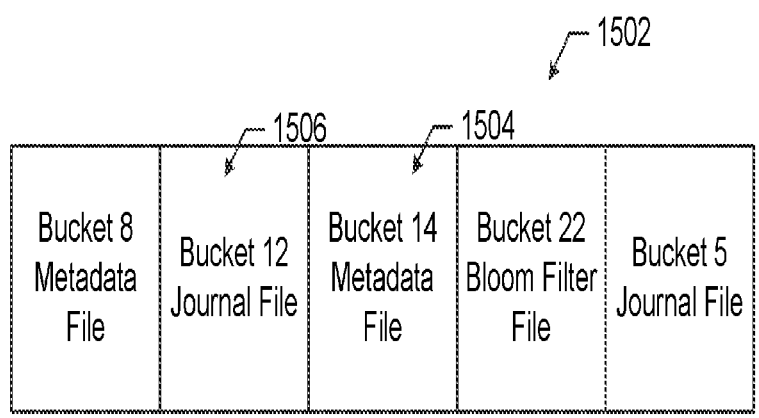

FIG. 15 shows an example for performing cache aware searching in accordance with one or more embodiments of the invention. The example is a simplified example for explanatory purposes only. In general, more files may exist in the cache and more buckets may be processed in the search query than shown in the example. In particular, FIG. shows a state of the cache at different time periods when a search query is processed. Turning to FIG. 15, consider the scenario in which a search query is received. Based on the result of the indexer, buckets 10-19 are relevant to processing the search query. The number on the buckets indicate the reverse chronological order on the buckets (i.e., bucket 10 has the most recent events and bucket 19 has the least recent events). Other search queries may also be concurrently processed using the cache. FIG. 15A shows a state of the cache (1502) at time t1. As shown in FIG. 15A, the cache includes the journal file of bucket 12 (1504) and the metadata file of bucket 14 (1506) based on the search query.

Because the metadata file of bucket 14 (1506) is already present in the cache, the metadata file of bucket 14 (1506) is processed without regard to the reverse chronological order. The metadata file of bucket 14 (1504) is a gate file for bucket 14. By performing the search using the metadata file of bucket 14 (1504), a determination may be made whether to request additional files in the cache for bucket 14. In the example, consider the scenario in which the result is not to bring in additional files because the hostname in the metadata file does not match the hostname of the search query. Accordingly, the metadata file (1506) is set for eviction.

Additionally, the journal file of bucket 12 (1506) is also present in the cache at the time that the search query is received. Based on the amount of time to evict other files to have enough storage space to store the metadata file, a determination is made to process the journal file out of order. Thus, the search is performed using the journal file of bucket 12 (1506) without processing the metadata file or the bloom filter file of bucket 12. In one or more embodiments, the search bucket predictor does not request the prefetch of the metadata file or the bloom filter file.

At the same time or concurrently with processing the search using the journal file of bucket 12 (1504) and the metadata file of bucket 14 (1506), the search bucket predictor may start prefetching the remaining files to processing the search. The prefetching of the remaining files may be in the reverse chronological order of the buckets, such as using the technique described in example FIGS. 14A and 14B.

As shown, by performing cache aware searching, one or more embodiments reduce the number of cache misses by performing the searching out of order. Further, by considering the amount of time to download gate files, one or more embodiments process searches faster by not waiting for gate files when less time is spent processing the non-gate files.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
in response to a search query, copying a first bucket from a remote storage to a cache, the first bucket including first data associated with the search query;
identifying a first file in the first bucket, wherein the first file is associated with a first usage status;
tracking a first wait time to access one or more files of the first bucket;
tracking a first search time to process the search query using the first bucket;
calculating a prefetch lookahead based on a ratio of the first wait time to the first search time,
wherein the prefetch lookahead represents a target number of buckets in a bucket prefetch window;
accessing, based on the search query, a second bucket from the remote storage, the second bucket including second data associated with the search query;
identifying a second file in the second bucket; and
copying, in response to the first usage status indicating that the first file was used in processing the search query, the second file from the remote storage to the cache.

2. The method of claim 1, further comprising:
identifying a third file in the first bucket;
identifying a fourth file in the second bucket; and
copying the fourth file based on a second usage status associated with the third file, wherein the second usage status indicates that the third file was used during the processing of the search query.

3. The method of claim 1, further comprising:
identifying a third file in the first bucket;
identifying a fourth file in the second bucket;
making a first determination whether to copy the fourth file based on a second usage status associated with the third file, wherein the second usage status indicates whether the third file was used during the processing of the search query;
making a second determination, based at least in part on the first determination indicating to copy the fourth file, whether to copy a fifth file of the second bucket; and
copying, based on the second determination, the fifth file from the remote storage to the cache.

4. The method of claim 1, further comprising:
accessing, based on the search query, a third bucket from the remote storage;
identifying a third file in the third bucket; and
copying the third file based at least in part on a fourth file, the fourth file being in one of two preceding processed buckets, wherein the fourth file is associated with a second usage status indicating that the fourth file was used during the processing of the search query.

5. The method of claim 1,
wherein the bucket prefetch window indicates a set of buckets that are candidates for prefetching, wherein prefetching comprises copying one or more files of a bucket of the set of buckets from the remote storage to the cache.

6. The method of claim 1, further comprising:
in response to the prefetch lookahead exceeding a size of the bucket prefetch window:
accessing, based on the search query, a third bucket from the remote storage;
identifying a third file in the third bucket; and
copying the third file from the remote storage to the cache.

7. The method of claim 1, further comprising:
tracking a second wait time to access one or more files of the second bucket;
tracking a second search time to process the search query using the second bucket;
recalculating the prefetch lookahead based on a ratio of the second wait time to the second search time; and
resizing the bucket prefetch window in response to recalculating the prefetch lookahead.

8. The method of claim 1, further comprising:
making a determination, based on evaluating the search query using the second file, whether to evaluate the search query using a third file of the second bucket; and
evaluating, based on the determination, the search query using the third file.

9. The method of claim 1, further comprising:
receiving a request to access a third file of the second bucket;
making a determination, in response to receiving the request, that the third file is not in the cache; and
copying, based on the determination, the third file from the remote storage to the cache.

10. The method of claim 1, further comprising:
identifying a third file in a third bucket;
making a determination, in response to the first usage status indicating that the first file was not used in processing the search query, not to copy the third file from the remote storage to the cache;
reversing the determination in response to a second usage status of a fourth file of a recently processed bucket indicating that the fourth file was used in processing the search query; and
copying, based on reversing the determination, the third file from the remote storage to the cache.

11. The method of claim 1, wherein the first bucket comprises at least one event, each event in the at least one event comprising a portion of raw machine data associated with a timestamp.

12. The method of claim 1, wherein the first bucket is associated with a first time frame and wherein the second bucket is associated with a second time frame.

13. The method of claim 1, wherein the remote storage is located in a cloud storage or a storage in an on-premises environment.

14. A computer system, comprising:
a data store comprising a cache and a remote storage;
a cache manager configured to:
   in response to a search query, copy a first bucket from the remote storage to the cache, the first bucket including first data associated with the search query;
   access, based on the search query, a second bucket from the remote storage, the second bucket including second data associated with the search query; and
   copy, in response to a first usage status indicating that a first file in the first bucket was used in processing the search query, a second file in the second bucket from the remote storage to the cache, wherein the first file is associated with the first usage status; and
a search bucket predictor configured to:
   identify the first file;
   track a first wait time to access one or more files of the first bucket;
   track a first search time to process the search query using the first bucket;
   calculate a prefetch lookahead based on a ratio of the first wait time to the first search time, wherein the prefetch lookahead represents a target number of buckets in a bucket prefetch window; and
   identify the second file.

15. The computer system of claim 14, wherein the search bucket predictor is further configured to:
identify a third file in the first bucket;
identify a fourth file in the second bucket; and
make a first determination whether to copy the fourth file based on a second usage status of the third file, wherein the second usage status indicates whether the third file was used during the processing of the search query.

16. The computer system of claim 14,
wherein the search bucket predictor is further configured to:
   identify a third file in the first bucket;
   identify a fourth file in the second bucket;
   make a first determination whether to copy the fourth file based on a second usage status of the third file, wherein the second usage status indicates whether the third file was used during the processing of the search query; and
   make a second determination, based at least in part on the first determination indicating to copy the fourth file, whether to copy a fifth file of the second bucket, and
wherein the cache manager is further configured to:
   copy, based on the second determination, the fifth file from the remote storage to the cache.

17. The computer system of claim 14,
wherein the cache manager is further configured to:
   access, based on the search query, a third bucket from the remote storage, and
   copy a third file in the third bucket based at least in part on a fourth file, the fourth file being in one of two preceding processed buckets, wherein the fourth file is associated with a second usage status indicating that the fourth file was used during the processing of the search query,
wherein the search bucket predictor is further configured to:
   identify the third file.

18. The computer system of claim 14,
wherein the bucket prefetch window indicates a set of buckets that are candidates for prefetching, wherein prefetching comprises copying one or more files of a bucket of the set of buckets from the remote storage to the cache.

19. The computer system of claim 14,
wherein the cache manager is further configured to:
   access, based on the search query, a third bucket from the remote storage, and
   copy a third file in the third bucket from the remote storage to the cache,
wherein the search bucket predictor is further configured to:
   in response to the prefetch lookahead exceeding a size of the bucket prefetch window, identify the third file based on the third file.

20. The computer system of claim 14, wherein the search bucket predictor is further configured to:
track a second wait time to access one or more files of the second bucket;
track a second search time to process the search query using the second bucket;
recalculate the prefetch lookahead based on a ratio of the second wait time to the second search time; and
resize the bucket prefetch window in response to recalculating the prefetch lookahead.

21. The computer system of claim 14, further comprising:
an indexer configured to make a determination, based on evaluating the search query using the second file, whether to evaluate the search query using a third file of the second bucket, and evaluate, based on the determination, the search query using the third file.

22. The computer system of claim 14, wherein the cache manager is further configured to:
receive a request to access a third file of the second bucket;
make a determination, in response to receiving the request, that the third file is not in the cache; and
copy, based on the determination, the third file from the remote storage to the cache.

23. A non-transitory computer-readable medium comprising instructions, execution of which in a computer system causes the computer system to:
in response to a search query, copy a first bucket from remote storage to a cache, the first bucket including first data associated with the search query;
identify a first file in the first bucket, wherein the first file is associated with a first usage status;
track a first wait time to access one or more files of the first bucket;
track a first search time to process the search query using the first bucket;
calculate a prefetch lookahead based on a ratio of the first wait time to the first search time, wherein the prefetch lookahead represents a target number of buckets in a bucket prefetch window;
access, based on the search query, a second bucket from the remote storage, the second bucket including second data associated with the search query;
identify a second file in the second bucket; and
copy, in response to the first usage status indicating that the first file was used in processing the search query, the second file from the remote storage to the cache.

24. The non-transitory computer-readable medium of claim 23, wherein the instructions, upon execution, further cause the computer system to:
identify a third file in the first bucket;
identify a fourth file in the second bucket; and make a first determination whether to copy the fourth file based on a second usage status of the third file, wherein the second usage status indicates whether the third file was used during the processing of the search query.

25. The non-transitory computer-readable medium of claim 23, wherein the instructions, upon execution, further cause the computer system to:
identify a third file in the first bucket;
identify a fourth file in the second bucket;
make a first determination whether to copy the fourth file based on a second usage status of the third file, wherein the second usage status indicates whether the third file was used during the processing of the search query;
make a second determination, based at least in part on the first determination indicating to copy the fourth file, whether to copy a fifth file of the second bucket; and
copy, based on the second determination, the fifth file from the remote storage to the cache.

26. The non-transitory computer-readable medium of claim 23, wherein the instructions, upon execution, further cause the computer system to:
access, based on the search query, a third bucket from the remote storage;
identify a third file in the third bucket; and
copy the third file based at least in part on a fourth file, the fourth file being in one of two preceding processed buckets, wherein the fourth file is associated with a second usage status indicating that the fourth file was used during the processing of the search query.

27. The non-transitory computer-readable medium of claim 23,
wherein the bucket prefetch window indicates a set of buckets that are candidates for prefetching, wherein prefetching comprises copying one or more files of a bucket of the set of buckets from the remote storage to the cache.

28. The non-transitory computer-readable medium of claim 23, wherein the instructions, upon execution, further cause the computer system to:
in response to the prefetch lookahead exceeding a size of the bucket prefetch window:
access, based on the search query, a third bucket from the remote storage;
identify a third file in the third bucket; and
copy the third file from the remote storage to the cache.

29. The non-transitory computer-readable medium of claim 23, wherein the instructions, upon execution, further cause the computer system to:
track a second wait time to access one or more files of the second bucket;
track a second search time to process the search query using the second bucket;
recalculate the prefetch lookahead based on a ratio of the second wait time to the second search time; and
resize the bucket prefetch window in response to recalculating the prefetch lookahead.

30. The non-transitory computer-readable medium of claim 23, wherein the instructions, upon execution, further cause the computer system to:
make a determination, based on evaluating the search query using the second file, whether to evaluate the search query using a third file of the second bucket; and
evaluate, based on the determination, the search query using the third file.

* * * * *